(12) United States Patent
Sharma et al.

(10) Patent No.: US 11,982,867 B2
(45) Date of Patent: May 14, 2024

(54) CAMERA ACTUATOR FOR LENS AND SENSOR SHIFTING

(71) Applicant: Apple Inc., Cupertino, CA (US)

(72) Inventors: Shashank Sharma, San Francisco, CA (US); Douglas S. Brodie, Los Gatos, CA (US); Scott W. Miller, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/189,973

(22) Filed: Mar. 24, 2023

(65) Prior Publication Data

US 2023/0236387 A1 Jul. 27, 2023

Related U.S. Application Data

(63) Continuation of application No. 17/145,100, filed on Jan. 8, 2021, now Pat. No. 11,614,597, which is a
(Continued)

(51) Int. Cl.
*G02B 7/09* (2021.01)
*H02P 25/034* (2016.01)
(Continued)

(52) U.S. Cl.
CPC .............. *G02B 7/09* (2013.01); *H02P 25/034* (2016.02); *H04N 23/54* (2023.01); *H04N 23/55* (2023.01); *H04N 23/67* (2023.01)

(58) Field of Classification Search
CPC . G02B 7/09; H02P 25/034; H02P 6/30; H02P 6/16; H04N 23/54; H04N 23/55; H04N 23/67; H04N 23/57
See application file for complete search history.

(56) References Cited

U.S. PATENT DOCUMENTS 7,170,690 B2 1/2007 Ophey
7,612,953 B2 11/2009 Nagai et al.
(Continued)

FOREIGN PATENT DOCUMENTS

CN 1940628 4/2007
CN 101808191 8/2010
(Continued)

OTHER PUBLICATIONS

Warren J. Smith, "Modern Lens Design," In: Modern Lens Design, Jan. 1, 1992, McGraw-Hill, Inc., XP055152035, ISBN: 978-0-07-059178-3, pp. 25-27.
(Continued)

*Primary Examiner* — James C. Jones
(74) *Attorney, Agent, or Firm* — Robert C. Kowert; Kowert, Hood, Munyon, Rankin & Goetzel, P.C.

(57) ABSTRACT

Some embodiments include a camera voice coil motor (VCM) actuator configured to shift a lens and/or an image sensor along multiple axes. The VCM actuator may include a bottom flexure and a top flexure that connect one or more dynamic members to one or more static members. The VCM actuator may include stationary magnets and coils held by dynamic members. In some cases, the VCM actuator may be configured to move the image sensor along an optical axis, to move the image sensor in directions orthogonal to the optical axis, and/or to tilt the image sensor relative to the orthogonal axis. In some examples, the VCM actuator may be configured to move the image sensor in directions orthogonal to the optical axis, to move the lens along the optical axis, and/or to tilt the lens relative to the optical axis.

20 Claims, 16 Drawing Sheets

Related U.S. Application Data continuation of application No. 15/940,661, filed on Mar. 29, 2018, now Pat. No. 10,890,734.

(60) Provisional application No. 62/478,487, filed on Mar. 29, 2017.

(51) Int. Cl.
*H04N 23/54* (2023.01)
*H04N 23/55* (2023.01)
*H04N 23/67* (2023.01)

(56) References Cited

U.S. PATENT DOCUMENTS

| | | |
|---|---|---|
| 7,630,618 B2 | 12/2009 | Nomura |
| 7,952,612 B2 | 5/2011 | Kakkori |
| RE42,642 E | 8/2011 | Sato et al. |
| 8,111,295 B2 | 2/2012 | Makimoto et al. |
| 8,248,497 B2 | 8/2012 | Tanimura et al. |
| 8,264,549 B2 | 9/2012 | Tokiwa et al. |
| 8,488,260 B2 | 7/2013 | Calvet et al. |
| 8,548,313 B2 | 10/2013 | Krueger |
| 8,749,643 B2 | 6/2014 | Lim et al. |
| 8,817,393 B2 | 8/2014 | Kwon |
| 8,866,918 B2 | 10/2014 | Gregory et al. |
| 8,908,086 B2 | 12/2014 | Kawai |
| 8,947,544 B2 | 2/2015 | Kawai |
| 8,998,514 B2 | 4/2015 | Gutierrez et al. |
| 9,298,017 B2 | 3/2016 | Sugawara et al. |
| 9,316,810 B2 | 4/2016 | Mercado |
| 9,578,217 B2 | 2/2017 | Gutierrez et al. |
| 9,632,280 B2 | 4/2017 | Yeo |
| 9,736,345 B1 | 8/2017 | Topliss et al. |
| 9,773,169 B1 | 9/2017 | Fulmer |
| 9,807,305 B2 | 10/2017 | Guitierrez |
| 10,257,433 B2 | 4/2019 | Eromaki |
| 10,863,094 B2 | 12/2020 | Sharma et al. |
| 10,890,734 B1 | 1/2021 | Sharma et al. |
| 10,924,675 B2 | 2/2021 | Hubert et al. |
| 11,122,205 B1 | 9/2021 | Sharma et al. |
| 11,163,141 B2 | 11/2021 | Yao et al. |
| 11,223,766 B2 | 1/2022 | Sharma et al. |
| 11,575,835 B2 | 2/2023 | Xu et al. |
| 11,582,388 B2 | 2/2023 | Hubert et al. |
| 11,614,597 B2 | 3/2023 | Sharma et al. |
| 11,635,597 B2 | 4/2023 | Yuhong et al. |
| 11,750,929 B2 | 9/2023 | Sharma et al. |
| 2001/0001588 A1 | 5/2001 | Matz |
| 2003/0160902 A1 | 8/2003 | Mihara et al. |
| 2003/0184878 A1 | 10/2003 | Tsuzuki |
| 2004/0105025 A1 | 6/2004 | Scherling |
| 2004/0257677 A1 | 12/2004 | Matsusaka |
| 2006/0017815 A1 | 1/2006 | Stavely et al. |
| 2007/0024739 A1 | 2/2007 | Konno |
| 2007/0070525 A1 | 3/2007 | Taniyama |
| 2007/0279497 A1 | 12/2007 | Wada et al. |
| 2009/0147340 A1 | 6/2009 | Lipton |
| 2009/0179995 A1 | 7/2009 | Fukumoto et al. |
| 2009/0295986 A1 | 12/2009 | Topliss et al. |
| 2009/0296238 A1 | 12/2009 | Kakuta |
| 2010/0165131 A1 | 7/2010 | Makimoto et al. |
| 2010/0315521 A1 | 12/2010 | Kunishige et al. |
| 2011/0141294 A1 | 6/2011 | Lam |
| 2011/0141339 A1 | 6/2011 | Scherling |
| 2011/0235194 A1 | 9/2011 | Nobe |
| 2012/0106936 A1 | 5/2012 | Lim et al. |
| 2012/0120512 A1 | 5/2012 | Wade et al. |
| 2012/0224075 A1 | 9/2012 | Lim |
| 2012/0268642 A1 | 10/2012 | Kawai |
| 2013/0107068 A1 | 5/2013 | Kim et al. |
| 2013/0119785 A1 | 5/2013 | Han |
| 2013/0250169 A1 | 9/2013 | Kim et al. |
| 2014/0009631 A1 | 1/2014 | Topliss |
| 2014/0111650 A1 | 4/2014 | Georgiev et al. |
| 2014/0139695 A1 | 5/2014 | Kawai |
| 2014/0255016 A1 | 9/2014 | Kim et al. |
| 2014/0327965 A1 | 11/2014 | Chen |
| 2015/0042870 A1 | 2/2015 | Chan et al. |
| 2015/0051097 A1 | 2/2015 | Anderton et al. |
| 2015/0135703 A1 | 5/2015 | Eddington et al. |
| 2015/0195439 A1 | 7/2015 | Miller et al. |
| 2015/0253543 A1 | 9/2015 | Mercado |
| 2015/0253647 A1 | 9/2015 | Mercado |
| 2015/0316748 A1 | 11/2015 | Cheo et al. |
| 2015/0350499 A1 | 12/2015 | Topliss |
| 2015/0358528 A1 | 12/2015 | Brodie et al. |
| 2016/0041363 A1 | 2/2016 | Hagiwara |
| 2016/0070115 A1 | 3/2016 | Miller et al. |
| 2016/0072998 A1 | 3/2016 | Yazawa |
| 2016/0073028 A1 | 3/2016 | Gleason et al. |
| 2016/0097937 A1 | 4/2016 | Lam |
| 2016/0154204 A1 | 6/2016 | Lim et al. |
| 2016/0154252 A1 | 6/2016 | Miller |
| 2016/0161828 A1 | 6/2016 | Lee |
| 2016/0209672 A1 | 7/2016 | Park et al. |
| 2016/0327773 A1 | 11/2016 | Choi et al. |
| 2016/0360111 A1 | 12/2016 | Thivent et al. |
| 2017/0023781 A1 | 1/2017 | Wang et al. |
| 2017/0054883 A1 | 2/2017 | Sharma et al. |
| 2017/0082829 A1 | 3/2017 | Kudo et al. |
| 2017/0108670 A1 | 4/2017 | Ko |
| 2017/0155816 A1 | 6/2017 | Ito et al. |
| 2017/0285362 A1 | 10/2017 | Hu et al. |
| 2017/0324906 A1 | 11/2017 | Kang et al. |
| 2017/0351158 A1 | 12/2017 | Kudo |
| 2017/0357076 A1 | 12/2017 | Scheele |
| 2018/0041668 A1* | 2/2018 | Cui ............... H04N 23/54 |
| 2018/0048793 A1 | 2/2018 | Gross et al. |
| 2018/0171991 A1 | 6/2018 | Miller et al. |
| 2018/0173080 A1 | 6/2018 | Enta |
| 2019/0014258 A1 | 1/2019 | Horesh |
| 2019/0041661 A1 | 2/2019 | Murakami |
| 2020/0314338 A1 | 10/2020 | Johnson |
| 2021/0168289 A1 | 6/2021 | Hubert et al. |
| 2021/0223563 A1 | 7/2021 | Miller |
| 2021/0409604 A1 | 12/2021 | Sharma et al. |
| 2022/0050277 A1 | 2/2022 | Yuhong et al. |
| 2022/0094853 A1 | 3/2022 | Xu et al. |
| 2022/0124249 A1 | 4/2022 | Sharma et al. |
| 2022/0247931 A1 | 8/2022 | Mahmoudzadeh |
| 2023/0188852 A1 | 6/2023 | Xu et al. |
| 2023/0199313 A1 | 6/2023 | Mahmoudzadeh |

FOREIGN PATENT DOCUMENTS

| | | |
|---|---|---|
| CN | 102135656 | 7/2011 |
| CN | 102749697 | 10/2012 |
| CN | 103117637 | 5/2013 |
| CN | 104767915 | 7/2015 |
| CN | 104898352 | 9/2015 |
| CN | 10502204 | 11/2015 |
| CN | 105025657 | 11/2015 |
| CN | 204903924 | 12/2015 |
| CN | 105573014 | 5/2016 |
| CN | 105652557 | 6/2016 |
| CN | 105807537 | 7/2016 |
| CN | 106291862 | 1/2017 |
| CN | 106470303 | 3/2017 |
| JP | H10285475 | 10/1998 |
| JP | 2006078854 | 3/2006 |
| JP | 2008203402 | 9/2008 |
| JP | 2011154403 | 8/2011 |
| JP | 2011203476 | 10/2011 |
| JP | 2013072967 | 4/2013 |
| JP | 2013125080 | 6/2013 |
| JP | 2015146040 | 8/2015 |
| JP | 2016028299 | 2/2016 |
| KR | 20100048361 | 5/2010 |
| KR | 20150051097 | 5/2015 |
| KR | 20160000759 | 1/2016 |
| TW | 201114249 | 4/2011 |
| TW | 201418863 | 5/2014 |

(56) References Cited

FOREIGN PATENT DOCUMENTS

| TW | I438543 | 5/2014 |
| WO | 2016011801 | 1/2016 |
| WO | 2020069391 | 4/2020 |

OTHER PUBLICATIONS

U.S. Appl. No. 18/353,805, filed Jul. 17, 2023, Shashank Sharma, et al.
U.S. Appl. No. 17/719,287, filed Apr. 12, 2022, Seyed Mohammad Javid Mahmoudzadeh.
U.S. Appl. No. 17/542,252, filed Dec. 3, 2021, Yuhong Yao.

* cited by examiner

CAMERA ACTUATOR FOR LENS AND SENSOR SHIFTING

This is a continuation of U.S. patent application Ser. No. 17/145,100, filed Jan. 8, 2021, which is a continuation of U.S. patent application Ser. No. 15/940,661, filed Mar. 29, 2018, now U.S. Pat. No. 10,890,734, which claims benefit of priority to U.S. Provisional Application No. 62/478,487, filed Mar. 29, 2017, which are hereby incorporated by reference in their entirety.

BACKGROUND

Technical Field

This disclosure relates generally to a camera actuator and more specifically to a voice coil motor (VCM) camera actuator for shifting a lens and/or an image sensor along multiple axes.

DESCRIPTION OF THE RELATED ART

The advent of small, mobile multipurpose devices such as smartphones and tablet or pad devices has resulted in a need for high-resolution, small form factor cameras for integration in the devices. Some small form factor cameras may incorporate optical image stabilization (OIS) mechanisms that may sense and react to external excitation/disturbance by adjusting location of the optical lens on the X and/or Y axis in an attempt to compensate for unwanted motion of the lens. Some small form factor cameras may incorporate an autofocus (AF) mechanism whereby the object focal distance can be adjusted to focus an object plane in front of the camera at an image plane to be captured by the image sensor. In some such autofocus mechanisms, the optical lens is moved as a single rigid body along the optical axis (referred to as the Z axis) of the camera to refocus the camera.

SUMMARY OF EMBODIMENTS

Some embodiments include a camera. The camera may include a lens, an image sensor, and a VCM actuator. In various embodiments, the VCM actuator may include a magnet, coils, a sensor shift platform, a first set of one or more flexures, and a second set of one or more flexures. The sensor shift platform may be coupled to the image sensor such that the image sensor moves together with the sensor shift platform.

In some embodiments, the first set of flexures may be configured to mechanically connect the sensor shift platform to a first static member of the camera. For instance, the first static member may be configured to be static relative to the sensor shift platform. The second set of flexures may be configured to mechanically connect a coil holder to a second static member of the camera. For instance, the second static member may be configured to be static relative to the sensor shift platform. The coil holder may be configured to support one or more of the coils. In some cases, the coil holder may be further configured to hold the lens. That is, the coil holder may also be considered a lens holder in some embodiments.

In various embodiments, the VCM actuator may be configured to move the image sensor in a plurality of directions orthogonal to the optical axis, e.g., to provide OIS functionality to the camera. Additionally, or alternatively, the VCM actuator may be configured to move the image sensor and/or the lens along the optical axis, e.g., to provide autofocus functionality to the camera. Additionally, or alternatively, the VCM actuator may be configured to tilt the image sensor and/or the lens relative to the optical axis.

Some embodiments include a voice coil motor (VCM) actuator. The VCM actuator may include a magnet, coils, a dynamic platform, a first static member, a second static member, a bottom flexure, and a top flexure. The dynamic platform may be configured to be coupled to an image sensor of a camera such that the image sensor moves together with the dynamic platform. Each of the first static member and the second static member may be configured to be static, e.g., relative to the dynamic platform. In various embodiments, the magnet and the coils may be configured to magnetically interact to move the image sensor in directions orthogonal to an optical axis of the camera, e.g., to provide optical image stabilization (OIS) functionality. Additionally, or alternatively, the magnet and the coils may be configured to magnetically interact to move the image sensor and/or the lens along the optical axis, e.g., to provide autofocus functionality. Additionally, or alternatively, the magnet and the coils may be configured to magnetically interact to tilt the image sensor and/or the lens relative to the optical axis.

In some embodiments, a device (e.g., a mobile multifunction device) may include one or more camera modules, a display, and/or one or more processors. For instance, a camera module may include a lens that defines an optical axis, an image sensor, and a voice coil motor (VCM) actuator. The image sensor may be configured to capture light passing through the lens and convert the captured light into image signals.

In various examples, the VCM actuator may include a sensor shift platform, a bottom flexure, and a top flexure. The sensor shift platform may be configured to be coupled to the image sensor such that the image sensor moves together with the sensor shift platform. The bottom flexure may be configured to mechanically connect the sensor shift platform to a first static member of the camera. The first static member may be configured to be static, e.g., relative to the sensor shift platform. The top flexure may be configured to mechanically connect a coil holder to a second static member of the camera. The second static member may be configured to be static, e.g., relative to the sensor shift platform. The coil holder may be configured to support one or more actuator coils. In some cases, the coil holder may be further configured to hold the lens.

In some embodiments, the processors may be configured to cause the VCM actuator to move the image sensor in directions orthogonal to the optical axis. Additionally, or alternatively, the processors may be configured to cause the VCM actuator to move the image sensor and/or the lens along the optical axis. Additionally, or alternatively, the processors may be configured to cause the VCM actuator to tilt the image sensor and/or the lens relative to the optical axis.

BRIEF DESCRIPTION OF THE DRAWINGS

FIG. 1 includes a perspective view of an example exterior of the camera module and a block diagram of example camera module components.

Figure 1:
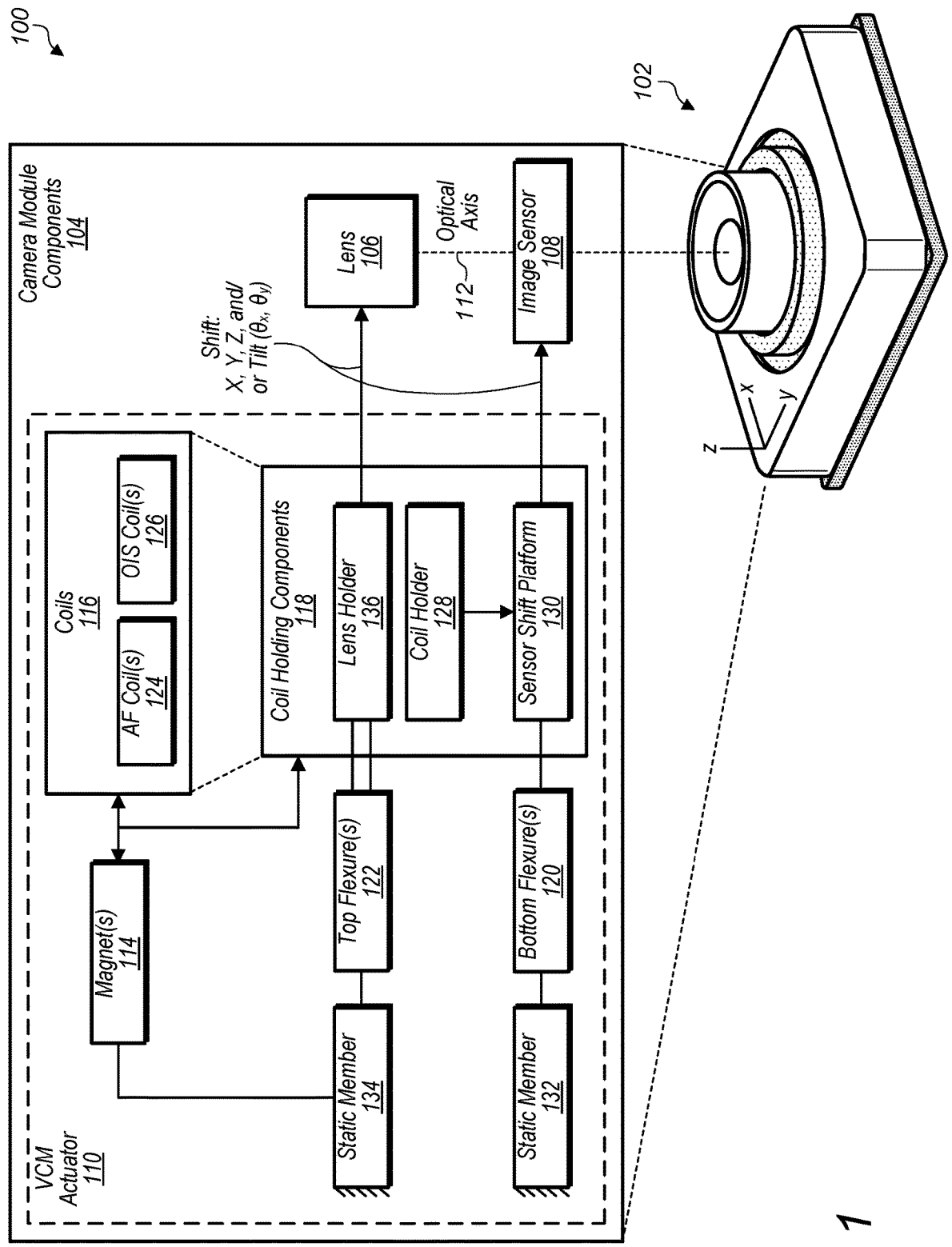
FIG. 1 illustrates an example camera module that includes a voice coil motor (VCM) actuator for shifting a lens and/or an image sensor along multiple axes, in accordance with some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

DETAILED DESCRIPTION

Some embodiments include camera equipment outfitted with controls, magnets, and voice coil motors to improve the effectiveness of a miniature actuation mechanism for a compact camera module. More specifically, in some embodiments, compact camera modules include actuators to deliver functions such as autofocus (AF), optical image stabilization (OIS), and/or tilt. One approach to delivering a very compact actuator for OIS is to use a voice coil motor (VCM) arrangement.

In some embodiments, a camera may include a lens, an image sensor, and a VCM actuator. The lens may define an optical axis. The image sensor may be configured to capture light passing through the lens and convert the captured light into image signals. In various embodiments, the VCM actuator may include a magnet, coils, a sensor shift platform, a first set of one or more flexures, and a second set of one or more flexures. The sensor shift platform may be coupled to the image sensor such that the image sensor moves together with the sensor shift platform.

In some embodiments, the first set of flexures may be configured to mechanically connect the sensor shift platform to a first static member of the camera. For instance, the first static member may be configured to be static relative to the sensor shift platform. The second set of flexures may be configured to mechanically connect a coil holder to a second static member of the camera. For instance, the second static member may be configured to be static relative to the sensor shift platform. The coil holder may be configured to support one or more of the coils. In some cases, the coil holder may be further configured to hold the lens.

In various embodiments, the VCM actuator may be configured to move the image sensor in a plurality of directions orthogonal to the optical axis, e.g., to provide OIS functionality to the camera. Additionally, or alternatively, the VCM actuator may be configured to move the image sensor and/or the lens along the optical axis, e.g., to provide autofocus functionality to the camera. Additionally, or alternatively, the VCM actuator may be configured to tilt the image sensor and/or the lens relative to the optical axis.

In some embodiments, the first set of flexures may be configured to provide compliance for movement (e.g., of the image sensor) in directions orthogonal to the optical axis and along the optical axis. The second set of flexures may be configured to provide compliance for movement (e.g., of the image sensor and/or the lens) in directions orthogonal to the optical axis and along the optical axis. In some cases, the second set of flexures may also be configured to support the coil holder and to provide stiffness to counteract tilt (e.g., of the image sensor and/or the lens) relative to the optical axis.

In some examples, the coils may include a first OIS coil and a second OIS coil. The first OIS coil may be held, by the coil holder, proximate a first side (e.g., a top side) of the magnet. The second OIS coil may be held, by the coil holder, proximate a second side (e.g., a bottom side) of the magnet that is opposite the first side. To move the image sensor in directions orthogonal to the optical axis, the VCM actuator may be configured to cause the first OIS coil and/or the second OIS coil to magnetically interact with the magnet.

According to some embodiments, the magnet may be a single pole magnet. Furthermore, the magnet may be configured to be static, e.g., relative to the coil holder. In some cases, the coils may include an autofocus coil disposed between the magnet and the coil holder. The autofocus coil may extend around the lens, e.g., along a plane that is orthogonal to the optical axis. To move the image sensor along the optical axis, the VCM actuator may be configured to cause the autofocus coil to magnetically interact with the magnet.

In some embodiments, the magnet may be a dual pole magnet. Furthermore, the magnet may be configured to be static, e.g., relative to the coil holder. In some cases, the coils may further include an autofocus coil disposed between the magnet and the coil holder. To move the image sensor along the optical axis and/or to tile the image sensor relative to the optical axis, the VCM actuator may be configured to cause the autofocus coil to magnetically interact with the magnet.

By using stationary magnets, reliability and power efficiency may be improved compared to VCM actuators that use moving magnets, as magnets tend to be among the heaviest objects in VCM actuators. Furthermore, embodiments described herein that include stationary magnets may be used in multi-aperture systems (e.g., side-by-side cameras) as two such VCM actuators being located next to each other will have minimal interaction due the magnets being stationary.

In some cases, the magnet may be part of a magnet arrangement that includes a first magnet, a second magnet, a third magnet, and a fourth magnet. The first magnet may be located to a first side of the lens. The second magnet maybe located to a second side of the lens and opposite the first magnet relative to the lens. The third magnet may be located to a third side of the lens. The fourth magnet may be located to a fourth side of the lens and opposite the third magnet relative to the lens. In some examples, a first axis may traverse the first magnet, the lens, and the second magnet. A second axis may traverse the third magnet, the lens, and the fourth magnet. The second axis may be orthogonal to the first axis. In some embodiments, the coils may include a first set of coils proximate the first magnet, a second set of coils proximate the second magnet, a third set of coils proximate the third magnet, and a fourth set of coils proximate the fourth magnet. Each set of coils may include a respective set of OIS coils and a respective autofocus coil.

In various embodiments, the coils may include an autofocus coil and an OIS coil. The autofocus coil may be held by the coil holder. The OIS coil may be located on the sensor shift platform. For instance, the OIS coil may be a flat race track coil that is etched on the sensor shift platform. The VCM actuator may be configured to move the image sensor in directions orthogonal to the optical axis, move the lens along the optical axis, and/or tilt the lens relative to the optical axis. To move the image sensor in directions orthogonal to the optical axis, the VCM actuator may be configured to cause the OIS coil to magnetically interact with the magnet. To move the lens along the optical axis and/or to tilt the lens relative to the optical axis, the VCM actuator may be configured to cause the autofocus coil to magnetically interact with the magnet.

According to some examples, the first set of flexures may be a part of a sensor shift arrangement of the VCM actuator. For instance, the sensor shift arrangement may be configured to provide compliance for movement of the image sensor in directions orthogonal to the optical axis. In some cases, the sensor shift arrangement may further include the sensor shift platform, an OIS coil on the sensor shift platform, and/or the image sensor. Furthermore, in some embodiments, the second set of flexures may be configured to mechanically connect the coil holder to the second static member. The second set of flexures may be part of a lens shift arrangement of the VCM actuator. For instance, the lens shift arrangement may be configured to provide compliance for movement of the lens along the optical axis and/or for tilt of the lens relative to the optical axis. In some cases, the lens shift arrangement may further include the lens, the coil holder (which may be further configured to hold the lens), an autofocus coil held by the coil holder, and/or a third set of one or more flexures configured to mechanically connect the coil holder to the first static member, the second static member, and/or a third static member.

In some embodiments, a voice coil motor (VCM) actuator may include a magnet, coils, a dynamic platform, a first static member, a second static member, a bottom flexure, and a top flexure. The dynamic platform may be configured to be coupled to an image sensor of a camera such that the image sensor moves together with the dynamic platform. Each of the first static member and the second static member may be configured to be static, e.g., relative to the dynamic platform. In various embodiments, the magnet and the coils may be configured to magnetically interact to move the image sensor in directions orthogonal to an optical axis of the camera, e.g., to provide optical image stabilization (OIS) functionality. Additionally, or alternatively, the magnet and the coils may be configured to magnetically interact to move the image sensor and/or the lens along the optical axis, e.g., to provide autofocus functionality. Additionally, or alternatively, the magnet and the coils may be configured to magnetically interact to tilt the image sensor and/or the lens relative to the optical axis.

In some embodiments, the bottom flexure may be configured to mechanically connect the dynamic platform to the first static member. The top flexure may be configured to mechanically connect a coil holder of the camera to the second static member. The coil holder may be configured to support one or more of the coils. In some cases, the coil holder may be further configured to hold a lens of the camera that defines the optical axis.

In some examples, the bottom flexure may extend, along a first plane that is orthogonal to the optical axis, from the dynamic platform to the first static member. Furthermore, the second flexure may extend, along a second plane that is orthogonal to the optical axis, from the coil holder to the second static member. In some cases, the first plane may be closer to the image sensor than the second plane. That is, a first distance between the first plane and the image sensor may be less than a second distance between the second plane and the image sensor. Additionally, or alternatively, the first plane may be closer to the image sensor than to the second plane. That is, the first distance between the first plane and the image sensor may be less than a third distance between the first plane and the second plane.

In some cases, the top flexure may be configured to mechanically connect the coil holder to the second static member. Furthermore, the coils may include a first OIS coil and a second OIS coil. The first OIS coil may be held, by the coil holder, proximate a first side (e.g., a top side) of the magnet. The second OIS coil may be held, by the coil holder, proximate a second side (e.g., a bottom side) of the magnet that is opposite the first side. In some examples, each of the first OIS coil and the second OIS coil may be a flat race track coil that is etched on the coil holder. To move the image sensor in directions orthogonal to the optical axis, the VCM actuator may be configured to cause the first OIS coil and/or the second OIS coil to magnetically interact with the magnet.

In some embodiments, the magnet may be a single pole magnet that is configured to be static relative to the coil holder. Furthermore, the coils may include an autofocus coil disposed between the magnet and the coil holder. The autofocus coil may extend around the lens along a plane that is orthogonal to the optical axis. To move the image sensor along the optical axis, the VCM actuator may be configured to cause the autofocus coil to magnetically interact with the magnet.

In some embodiments, the magnet may be a dual pole magnet that is configured to be static relative to the coil holder. Furthermore, the coils may include an autofocus coil held, by the coil holder, proximate a third side of the magnet that is adjacent to the first and second sides of the magnet. To move the image sensor along the optical axis and/or to tilt the image sensor relative to the optical axis, the VCM actuator may be configured to cause the autofocus coil to magnetically interact with the magnet.

According to some embodiments, the magnet may be a single pole magnet. Furthermore, the coils may include an autofocus coil and an OIS coil. The autofocus coil may be held by the coil holder. The OIS coil may be a flat race track coil that is etched on the dynamic platform. To move the image sensor in directions orthogonal to the optical axis, the VCM actuator may be configured to cause the OIS coil to magnetically interact with the magnet. To move the lens along the optical axis and/or to tilt the lens relative to the optical axis, the VCM actuator may be configured to cause the autofocus coil to magnetically interact with the magnet.

In some embodiments, a device (e.g., a mobile multifunction device) may include one or more camera modules, a display, and/or one or more processors. For instance, a camera module may include a lens that defines an optical axis, an image sensor, and a voice coil motor (VCM) actuator. The image sensor may be configured to capture light passing through the lens and convert the captured light into image signals.

In various examples, the VCM actuator may include a sensor shift platform, a bottom flexure, and a top flexure. The sensor shift platform may be configured to be coupled to the image sensor such that the image sensor moves together with the sensor shift platform. The bottom flexure may be configured to mechanically connect the sensor shift platform to a first static member of the camera. The first static member may be configured to be static, e.g., relative to the sensor shift platform. The top flexure may be configured to mechanically connect a coil holder to a second static member of the camera. The second static member may be configured to be static, e.g., relative to the sensor shift platform. The coil holder may be configured to support one or more actuator coils. In some cases, the coil holder may be further configured to hold the lens.

In some embodiments, the processors may be configured to cause the VCM actuator to move the image sensor in directions orthogonal to the optical axis. Additionally, or alternatively, the processors may be configured to cause the VCM actuator to move the image sensor and/or the lens along the optical axis. Additionally, or alternatively, the processors may be configured to cause the VCM actuator to tilt the image sensor and/or the lens relative to the optical axis.

In some cases, the processors may be configured to cause the display to present an image based at least in part on one or more of the image signals from the image sensor. For instance, the image sensor may be in electrical contact with the sensor shift platform. The bottom flexure may include one or more electrical traces configured to convey the image signals from the sensor shift platform to the first static member. Furthermore, the first static member may be in electrical contact with a flex circuit board of the device such that the first static member conveys the image signals to the flex circuit board. The processors may be configured to receive the image signals at least partly via the flex circuit board.

Reference will now be made in detail to embodiments, examples of which are illustrated in the accompanying drawings. In the following detailed description, numerous specific details are set forth in order to provide a thorough understanding of the present disclosure. However, it will be apparent to one of ordinary skill in the art that some embodiments may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the intended scope. The first contact and the second contact are both contacts, but they are not the same contact.

The terminology used in the description herein is for the purpose of describing particular embodiments only and is not intended to be limiting. As used in the description and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

FIG. 1 illustrates an example camera module 100 that includes a voice coil motor (VCM) actuator for shifting a lens and/or an image sensor along multiple axes, in accordance with some embodiments. FIG. 1 includes a perspective view of an example exterior 102 of the camera module 100 and a block diagram of example camera module components 104 of the camera module 100. In some embodiments, the camera module 100 may include one or multiple features, components, and/or functionality of embodiments described herein with reference to FIGS. 2A-11.

In some embodiments, the camera module components 104 may include a lens 106, an image sensor 108, and a VCM actuator 110. The lens 106 may define an optical axis 112. The image sensor 108 may be configured to capture light passing through the lens 106 and convert the captured light into image signals. In various embodiments, the VCM actuator 110 may include magnets 114, coils 116, one or more coil holding components 118, one or more bottom flexures 120, and one or more top flexures 122.

The magnets 114 and the coils 116 may be configured to magnetically interact, e.g., to produce Lorentz forces that cause one or more of the coil holding components 118 to shift along multiple axes. For instance, the coil holding component(s) may move in directions orthogonal to the optical axis 112 (e.g., along the x-y plane). Additionally, or alternatively, the coil holding component(s) 118 may move along the optical axis (e.g., along the z axis). Additionally, or alternatively, the coil holding component(s) 118 may tilt relative to the optical axis (e.g., along the x- and y-axes). In various examples, the lens 106 and/or the image sensor 108 may be configured to shift together with, and in a similar or same manner as, one or more of the coil holding components.

The coils 116 may include autofocus (AF) coils 124 and/or optical image stabilization (OIS) coils 126. In some cases, the autofocus coils 124 and the optical image stabilization coils 126 may be held by a same coil holding component 118. In other cases, the autofocus coils 124 and the optical image stabilization coils 128 may be held by different coil holding components 118.

In some embodiments, the coil holding components 118 may include a coil holder 128 that is configured to hold at least one AF coil 124 and at least one OIS coil 126. The coil holder 128 may be coupled to the sensor shift platform 130 such that the sensor shift platform 130 shifts together with the coil holder 130. Furthermore, the sensor shift platform 130 may be coupled to the image sensor 108 such that the image sensor 108 shifts together with the sensor shift platform 130. In some cases, the coil holder 128 may also be configured to hold the lens 106 and may thus be referred to herein as a "lens holder" (e.g., lens holder 136).

The bottom flexures 120 may be configured to mechanically connect the sensor shift platform 130 to a static member 132 (e.g., a base). The bottom flexures 120 may also be configured to provide compliance for movement of the sensor shift platform 130. Furthermore, the bottom flexures 120 may be configured to support, at least in part, the sensor shift platform 130.

The top flexures 122 may be configured to mechanically connect the coil holder 128 to another static member 134 (e.g., a case that at least partially encompasses an interior of the camera module 100). The top flexures 122 may also be configured to provide compliance for movement of the coil holder 128. Furthermore, the top flexures 122 may be configured to support the coil holder 128 and/or to provide stiffness to counteract tilt of the coil holder 128 relative to the optical axis.

The AF coil(s) 124 and the OIS coil(s) 126 may receive a current and magnetically interact with the magnet(s) 114 to produce forces that cause the coil holder 128 to shift. For instance, interaction between the AF coil(s) 124 and the magnet(s) 114 may produce forces that cause the coil holder 128 to move along the optical axis 112 and/or to tilt relative to the optical axis 112. Interaction between the OIS coil(s) 116 and the magnet(s) 114 may produce forces that cause the coil holder 128 to move in directions orthogonal to the optical axis 112. In some embodiments, the sensor shift platform 130 may be suspended from, or otherwise coupled to, the coil holder 128. Accordingly, the sensor shift platform 130 may shift together with, and in a similar or same manner as, the coil holder 128. Furthermore, the image sensor 108 may be suspended from, or otherwise coupled to, the sensor shift platform 130. Accordingly, the image sensor 108 may shift together with, and in a similar or same manner as, the sensor shift platform 130.

In some embodiments, the coil holding components 118 may include the sensor shift platform 130 and a lens holder 136 (also referred to herein as a "coil holder"). For instance, the sensor shift platform 130 may be configured to hold at least one OIS coil 126, and the lens holder 136 may be configured to hold at least one autofocus coil 124. The sensor shift platform 130 may be coupled to the image sensor 108 such that the image sensor 108 shifts together with the sensor shift platform 130. Furthermore, the lens holder 136 may be coupled to the lens 106 such that the lens 106 shifts together with the lens holder 136.

The bottom flexures 120 may be configured to mechanically connect the sensor shift platform 130 to the static member 132. The bottom flexures 120 may also be configured to provide compliance for movement of the sensor shift platform 130. Furthermore, the bottom flexures 120 may be configured to support, at least in part, the sensor shift platform 130. For example, the sensor shift platform 130 may be suspended from the bottom flexures 120.

The top flexures 122 may be configured to mechanically connect the lens holder 136 to the static member 134. The top flexures 122 may also be configured to provide compliance for movement of the lens holder 136. Furthermore, the top flexures 122 may be configured to support, at least in part, the lens holder 136. For example, the lens holder 136 may be suspended from the top flexures 122. As will be discussed in further detail below with reference to FIGS. 4A and 4B, one or more additional flexures may be used to mechanically connect the lens holder 136 and/or the sensor shift platform 130 to a static member.

The AF coil(s) 124 may receive a current and magnetically interact with the magnet(s) 114 to produce forces that cause the lens holder 136 to shift. For instance, interaction between the AF coil(s) 124 and the magnet(s) 114 may produce forces that cause the lens holder 136 to move along the optical axis 112 and/or to tilt relative to the optical axis 112. The lens 106 may shift together with, and in a similar or same manner as, the lens holder 136.

Furthermore, the OIS coil(s) 126 may receive a current and magnetically interact with the magnet(s) 114 to produce forces that cause the sensor shift platform 130 to shift. For instance, interaction between the OIS coil(s) 126 and the magnet(s) 114 may produce forces that cause the sensor shift platform 130 to move in directions orthogonal to the optical axis 112. The image sensor 108 may shift together with, and in a similar or same manner as, the sensor shift platform 130.

Figure 2A:
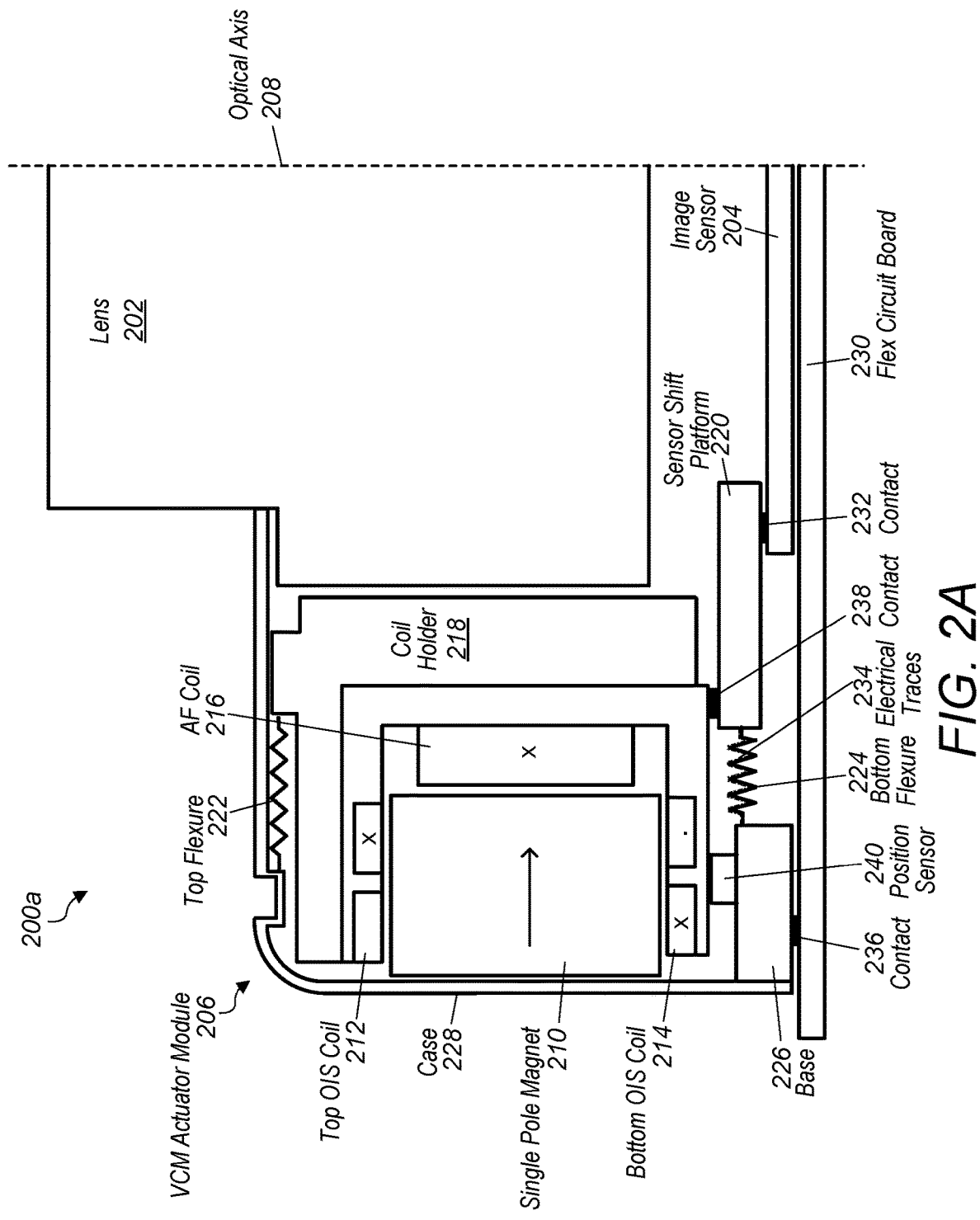
FIG. 2A illustrates a cross-sectional view of an example camera module that includes a voice coil motor (VCM) actuator for shifting an image sensor along multiple axes, in accordance with some embodiments.

FIG. 2A illustrates a cross-sectional view of an example camera module 200*a* that includes a voice coil motor (VCM) actuator for shifting an image sensor along multiple axes, in accordance with some embodiments. In some embodiments, the camera module 200 may include one or multiple features, components, and/or functionality of embodiments described herein with reference to FIGS. 1 and 2B-11.

In some embodiments, the camera module 200*a* may include a lens 202, an image sensor 204, and a VCM actuator module 206. The lens 202 may define an optical axis 208. In some examples, the lens 202 may be a fixed lens. The image sensor 204 may be configured to capture light passing through the lens 202 and convert the captured light into image signals. In some cases, the VCM actuator module 206 may be one of multiple VCM actuator modules of the camera module 200*a*. For instance, the camera module 200*a* may include four such VCM actuator modules 206, such as two pairs of VCM actuator modules 206 that oppose one another relative to the lens 202. As discussed in further detail below, the VCM actuator module(s) 206 may be configured to shift the image sensor 204 along three axes in some embodiments. For instance, the VCM actuator module(s) 206 may shift the image sensor 204 along the optical axis 208 (e.g., to provide autofocus (AF) functionality) and/or in directions orthogonal to the optical axis 208 (e.g., to provide optical image stabilization (OIS) functionality).

In various embodiments, the VCM actuator module 206 may include a stationary single pole magnet 210, a top OIS coil 212, a bottom OIS coil 214, and an AF coil 216. Furthermore, the VCM actuator module 206 may include a coil holder 218, a sensor shift platform 220, a top flexure 222, and a bottom flexure 224.

In some embodiments, the coil holder 218 may hold, or otherwise support, the top OIS coil 212, the bottom OIS coil 214, and the AF coil 216. The coil holder 218 may be coupled to the sensor shift platform 220 such that the sensor shift platform 220 shifts together with the coil holder 218. Furthermore, the sensor shift platform 220 may be coupled to the image sensor 204 such that the image sensor 204 shifts together with the sensor shift platform 220.

The bottom flexure 224 may be configured to mechanically connect the sensor shift platform 220 to a base 226 of the VCM actuator module(s) 206 and/or of the camera module 200*a*. The bottom flexure 224 may also be configured to provide compliance for movement of the sensor shift platform 220 along the optical axis 208 and in directions orthogonal to the optical axis 208. Furthermore, the bottom flexure 224 may be configured to support, at least in part, the sensor shift platform 220. In some cases, the sensor shift platform 220 may be suspended from the bottom flexure 224 and the coil holder 218. The base 226 may be a static member that is static relative to one or more moving components (e.g., the sensor shift platform 220). In other embodiments, the bottom flexure 224 may additionally, or alternatively, be connected to a different static member.

The top flexure 222 may be configured to mechanically connect the coil holder 218 to a case 228 of the VCM actuator module(s) and/or of the camera module 200*a*. The top flexure 222 may also be configured to provide compliance for movement of the coil holder 218 along the optical axis 208 and in directions orthogonal to the optical axis 208. Furthermore, the top flexure 222 may be configured to support the coil holder 218 and/or to provide stiffness to counteract tilt of the coil holder 218 relative to the optical axis 208. The case 228 may encompass, at least in part, an interior of the camera module 200*a*. The case 228 may be a static member that is static relative to one or more moving components (e.g., the sensor shift platform 220). In other embodiments, the top flexure 222 may additionally, or alternatively, be connected to a different static member.

In some embodiments, the stationary single pole magnet 210 may be fixed to a static member (e.g., the case 228). The coil holder 218 may be configured to at least partially encompass an outer perimeter of the single pole magnet 210. As illustrated in FIG. 2A, the top OIS coil 212 may be held, by the coil holder 218, proximate a top side of the single pole magnet 210. Furthermore, the bottom OIS coil 214 may be held, by the coil holder 218, proximate a bottom side of the single pole magnet 210. In some examples, each of the top OIS coil 212 and the bottom OIS coil 214 may be a flat race track coil that is etched on the coil holder 218. In some embodiments, the top OIS coil 212 and the bottom OIS coil 214 are formed using a semi-additive manufacturing process in which conductors are grown on metal substrates. The metal substrates may be formed into different shapes based on the particular design of the VCM actuator module 206. In some instances, current flow through the top OIS coil 212 may be in a direction that is opposite the current flow through the bottom OIS coil 214. Furthermore, each of the top OIS coil 212 and the bottom OIS coil 214 may be oriented such that current flows through the respective coil 212, 214 along a respective plane that is orthogonal to the optical axis 208.

In some embodiments, the VCM actuator module 206 may include one of the top OIS coil 212 or the bottom OIS coil 214 instead of including both. By including both, however, as one moves away from the single pole magnet 210 (e.g., due to magnetic interaction between the AF coil 216 and the single pole magnet 210), the other moves closer to the single pole magnet 210. That is, at least one of the top OIS coil 212 or the bottom OIS coil 214 will be capable of effectively interacting with the single pole magnet 210 at all times.

The AF coil 216 may be held by the coil holder 218 such that the AF coil 216 is disposed between the single pole magnet 210 and the coil holder 218. In various embodiments, the AF coil 216 may extend around the lens 202, e.g., along a plane that is orthogonal to the optical axis 208.

Interaction between the AF coil 216 and the single pole magnet 210 may produce forces that cause the coil holder 218 to move along the optical axis 208. Interaction between the single pole magnet 210 and the top OIS coil 212 and/or the bottom OIS coil 214 may produce forces that cause the coil holder 218 to move in directions orthogonal to the optical axis 208. The sensor shift platform 220 may shift together with, and in a similar or same manner as, the coil holder 218. Furthermore, the image sensor 204 may shift together with, and in a similar or same manner as, the sensor shift platform 220.

In various embodiments, electrical contacts/connections may allow for image signals to be conveyed from the image sensor 204 to a flex circuit board 230. For instance, the image sensor 204 may be in electrical contact with the sensor shift platform 220 via one or more contacts 232, and thus the image signals may be conveyed from the image sensor 204 to the sensor shift platform 220. The image signals may be conveyed from the sensor shift platform 220 to the base 226 via bottom flexure 224. For instance, the bottom flexure 224 may include electrical traces 234 that allow for the image signals to be conveyed from the sensor shift platform 220 to the base 226. The base 226 may be in electrical contact with the flex circuit board 230 via one or more contacts 236, and thus the image signals may be conveyed from the base 226 to the flex circuit board 230.

According to various examples, electrical contacts/connections may allow for current to be conveyed from the flex circuit board 230 to the coil holder 218 to drive one or more of the coils 212, 214, 216. For instance, the flex circuit board 230 may convey the current to the base 226 via the contact (s) 236. The current may be conveyed from the base 226 to the image sensor platform 220 via the electrical traces 234 of the bottom flexure 224. The image sensor platform 220 may be in electrical contact with the coil holder 218 via one or more contacts 238, and thus the current may be conveyed from the image sensor platform 220 to the coil holder 218. The coil holder 218 may convey the current to one or more of the coils 212, 214, 216.

In some embodiments, the VCM actuator module 206 and/or the camera module 200a may include a position sensor 240 (e.g., a Hall sensor) for position detection based on movement of the bottom OIS coil 214 and/or the top OIS coil 212 in directions orthogonal to the optical axis 208. For example, the position sensor 240 may be located on the base 226 or otherwise proximate the bottom OIS coil 214 and/or the top OIS coil 212.

Although the coil holder 218 and the sensor shift platform 220 are shown in FIG. 2A as two separate pieces, it is understood that the coil holder 218 and the sensor shift platform 220 may be a single piece in some embodiments.

Figure 2B:
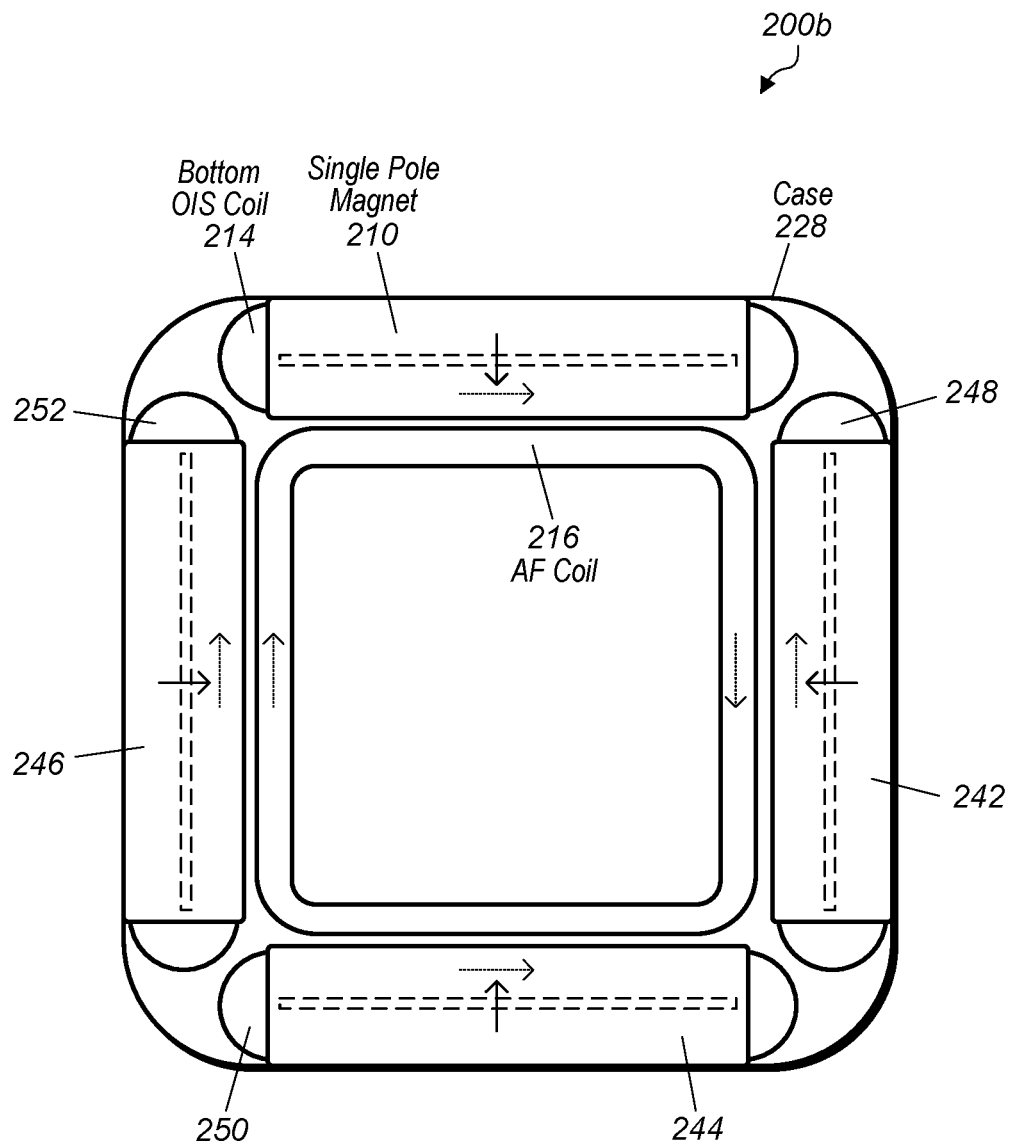
FIG. 2B illustrates a top view of an example magnet and coil arrangement of the VCM actuator in the camera module of FIG. 2A, in accordance with some embodiments.

FIG. 2B illustrates a top view of an example magnet and coil arrangement 200b of the VCM actuator in the camera module 200a of FIG. 2A, in accordance with some embodiments. In some embodiments, the magnet and coil arrangement 200b may include one or multiple features, components, and/or functionality of embodiments described herein with reference to FIGS. 1, 2A, and 3A-11.

The magnet arrangement may include a first single pole magnet 210, a second single pole magnet 242, a third single pole magnet 244, and a fourth single pole magnet 246. In some embodiments, each of the magnets may be stationary magnets. For instance, each of the magnets may be fixed to the case 228. The polarities of the magnets are indicated in FIG. 2B by the solid arrows. As shown, each of the polarities may point inwards. In other embodiments, each of the polarities may point outwards.

The coil arrangement may include the autofocus coil 216, a first bottom OIS coil 214 below the first single pole magnet 210, a second bottom OIS coil 248 below the second single pole magnet 242, a third bottom OIS coil 250 below the third single pole magnet 244, and a fourth bottom OIS coil 252 below the fourth single pole magnet 246. Although not shown in FIG. 2B, the coil arrangement may include a set of top OIS coils that are arranged like the bottom OIS coils, but that are instead located above a respective one of the single pole magnets. The direction of current flow of the coils are indicated in FIG. 2B by the dashed arrows.

Figure 3A:
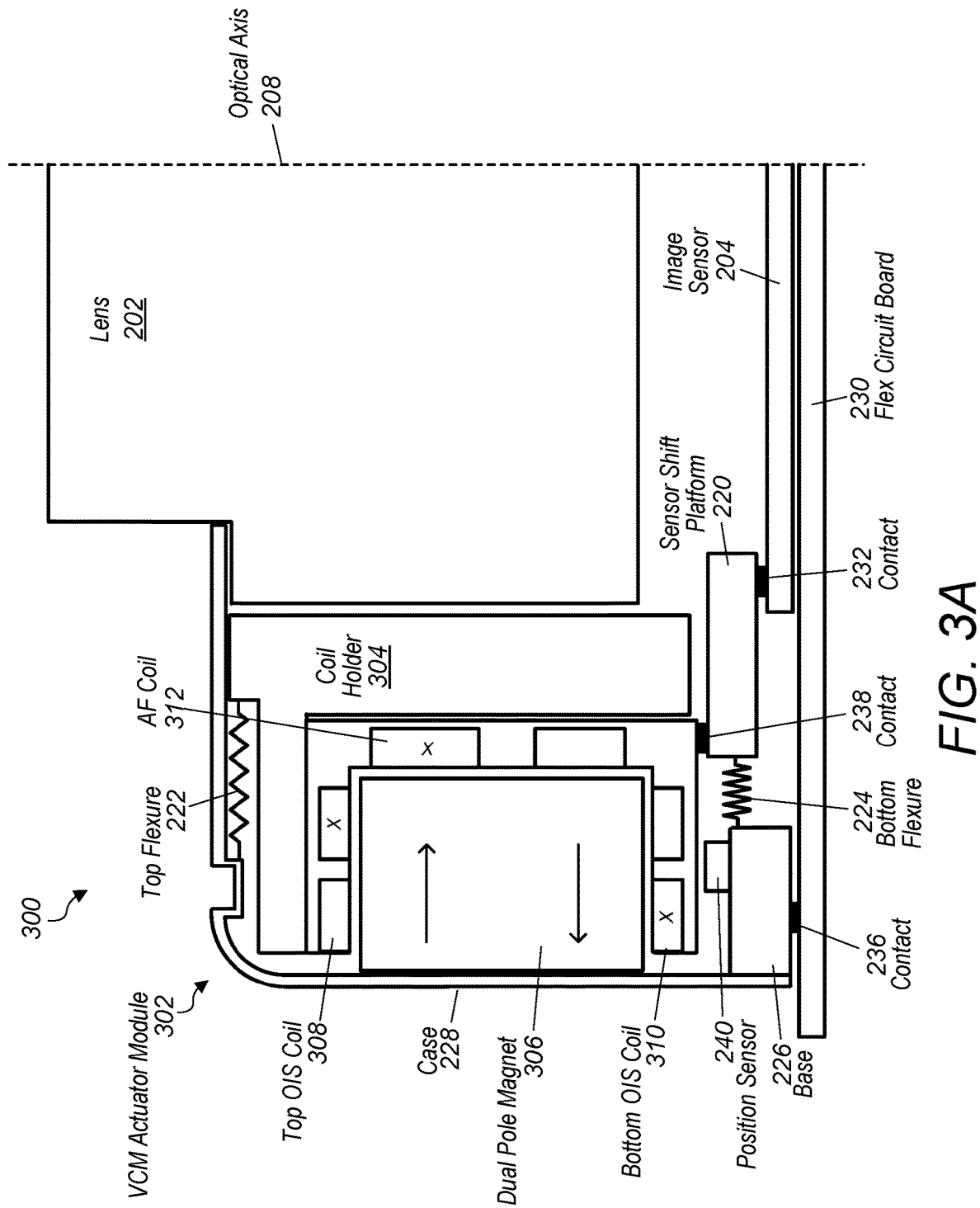
FIGS. 3A and 3B each illustrate a respective cross-sectional view of another example camera module that includes a voice coil motor (VCM) actuator for shifting an image sensor along multiple axis, in accordance with some embodiments.
Figure 3B:
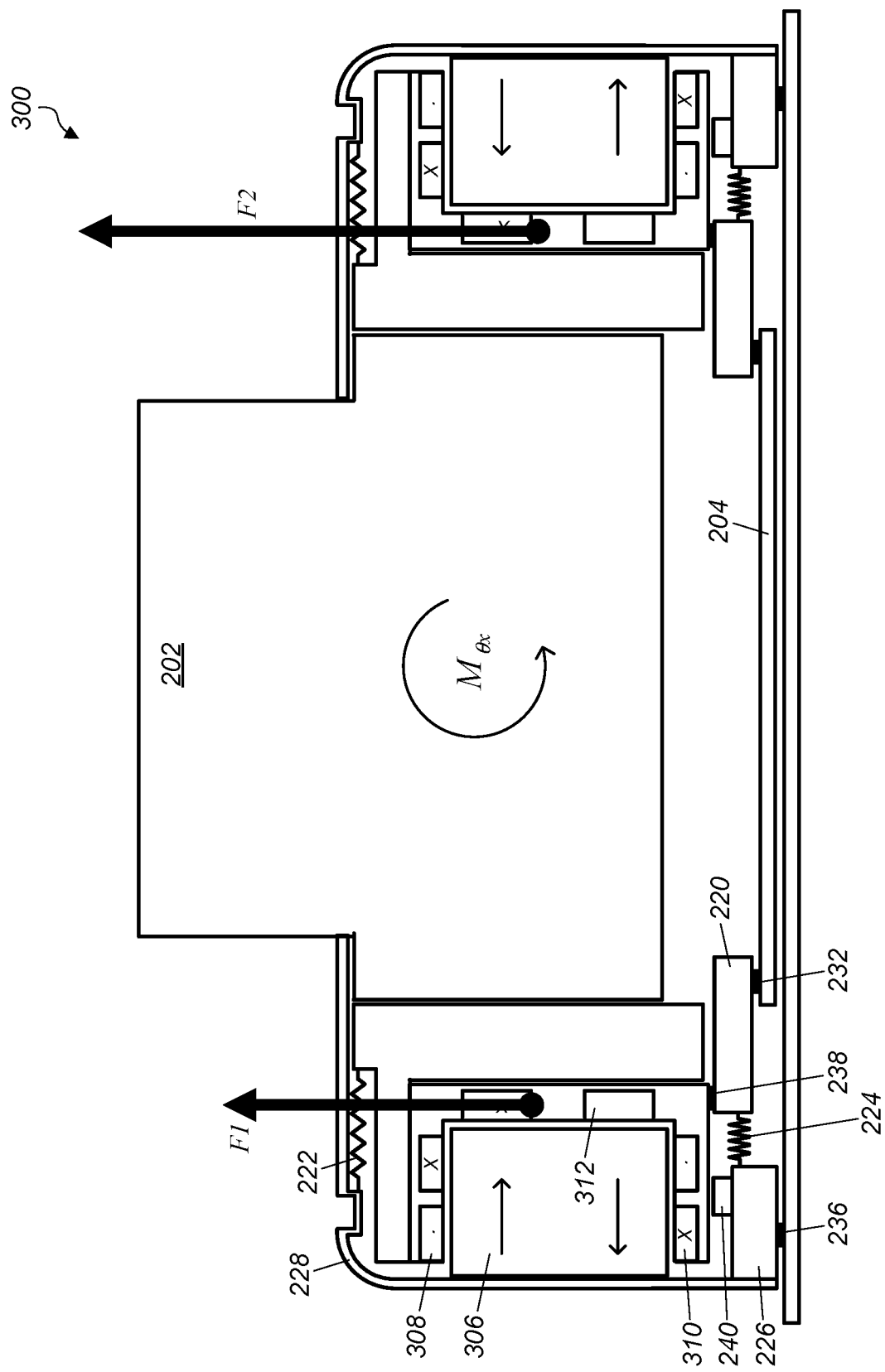

FIGS. 3A and 3B each illustrate a respective cross-sectional view of another example camera module 300 that includes a voice coil motor (VCM) actuator for shifting an image sensor along multiple axis, in accordance with some embodiments. In some embodiments, the camera module 300 may include one or multiple features, components, and/or functionality of embodiments described herein with reference to FIGS. 1 and 2B and 3C-11.

In some embodiments, the camera module 300 may include several of the same structural elements as the camera module 200a described above with reference to FIG. 2A. However, as discussed in further detail below, the coil holder 304 of the VCM actuator module 302 of the camera module 300 may have a different coil arrangement than that of the VCM actuator module 206 in the camera module 200a. Furthermore, the VCM actuator module 302 may include a dual pole magnet 306 instead of the single pole magnet 210 of the VCM actuator module 206 in the camera module 200a. In some cases, the VCM actuator module 302 may be one of multiple VCM actuator modules of the camera module 300. For instance, the camera module 300 may include four such VCM actuator modules 302, such as two pairs of VCM actuator modules 302 that oppose one another relative to the lens 202. The VCM actuator module(s) 302 may be configured to shift the image sensor 204 along five axes in some embodiments. For instance, the VCM actuator module(s) 302 may move the image sensor 204 along the optical axis 208 (e.g., to provide autofocus (AF) functionality), move the image sensor 204 in directions orthogonal to the optical axis 208 (e.g., to provide optical image stabilization (OIS) functionality), and/or tilt the image sensor 204 relative to the optical axis 208.

In some embodiments, the dual pole magnet 306 may be fixed to a static member (e.g., the case 228). The coil holder 304 may be configured to at least partially encompass an outer perimeter of the dual pole magnet 306. As illustrated in FIGS. 3A and 3B, the top OIS coil 308 may be held, by the coil holder 304, proximate a top side of the dual pole magnet 306. Furthermore, the bottom OIS coil 310 may be held, by the coil holder 304, proximate a bottom side of the dual pole magnet 306.

The coil holder 304 may be configured to hold the AF coil 312 proximate a side of the dual pole magnet 306 that is adjacent to the top side and the bottom side of the dual pole magnet 306. Instead of having a single AF coil that extends around the lens and that is shared by multiple VCM actuator modules, such as the AF coil 216 described above with reference to FIG. 2A, each VCM actuator module 302 in the camera module 300 may include a separate AF coil 312.

Interaction between the AF coil 312 and the dual pole magnet 306 may produce forces that cause the coil holder 304 to move along the optical axis 208. Because each VCM actuator 302 in the camera module 300 may include a separate AF coil 312, interaction between the AF coil 312 and the dual pole magnet 306 may also produce forces that cause the coil holder 304 to tilt relative to the optical axis 208, as indicated by $M_{theta\_x}$ in FIG. 3B. Furthermore, interaction between the dual pole magnet 306 and the top OIS coil 308 and/or the bottom OIS coil 310 may produce forces that cause the coil holder 304 to move in directions orthogonal to the optical axis 208. The sensor shift platform 220 may shift together with, and in a similar or same manner as, the coil holder 304. Furthermore, the image sensor 204 may shift together with, and in a similar or same manner as, the sensor shift platform 220.

Figure 3C:
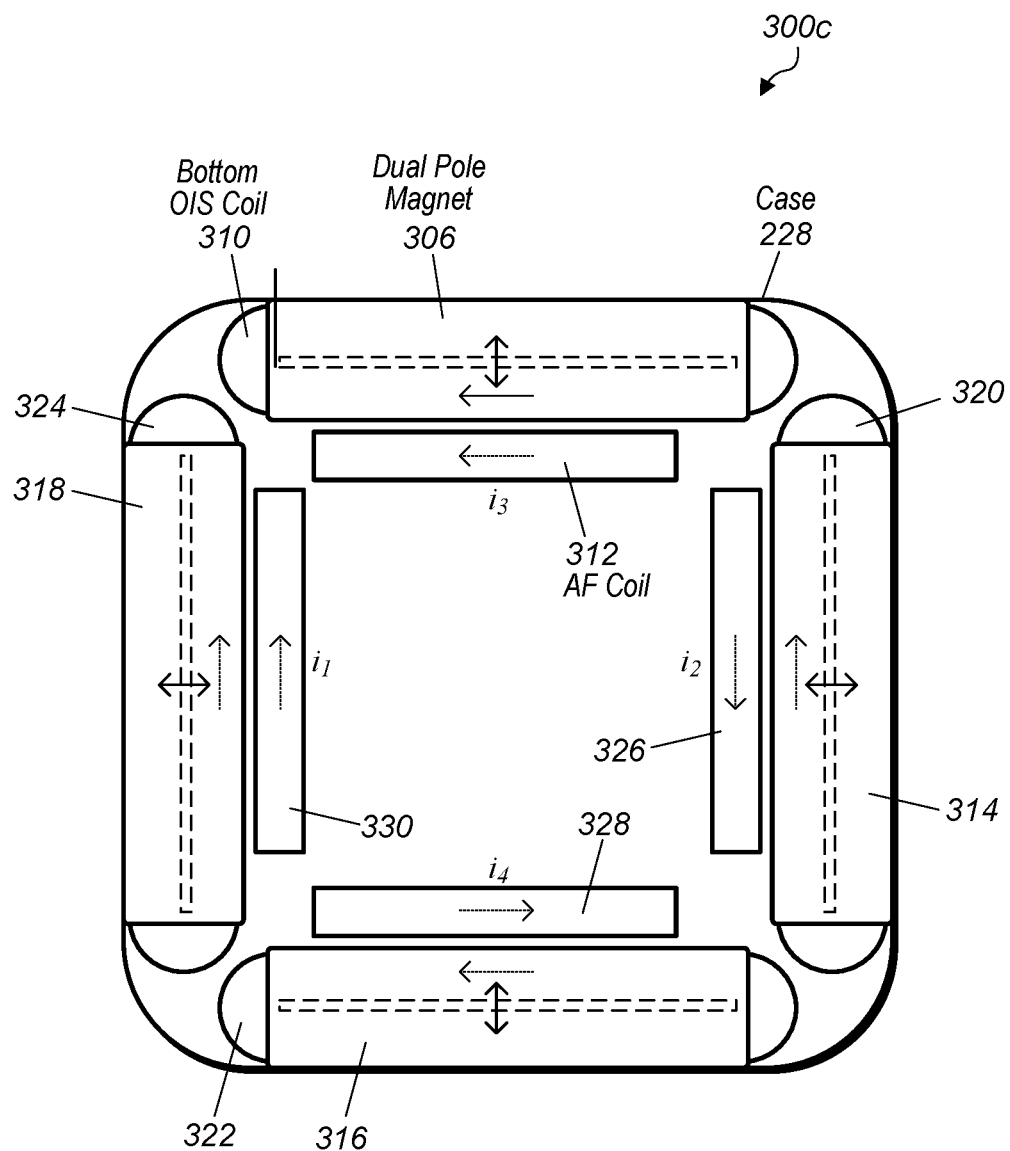
FIG. 3C illustrates a top view of an example magnet and coil arrangement of the VCM actuator in the camera module of FIGS. 3A and 3B, in accordance with some embodiments.

FIG. 3C illustrates a top view of an example magnet and coil arrangement 300c of the VCM actuator in the camera module 300 of FIGS. 3A and 3B, in accordance with some embodiments. In some embodiments, the magnet and coil arrangement 300c may include one or multiple features, components, and/or functionality of embodiments described herein with reference to FIGS. 1-3B and 4A-11.

The magnet arrangement may include a first dual pole magnet 306, a second dual pole magnet 314, a third dual pole magnet 316, and a fourth dual pole magnet 318. In some embodiments, each of the magnets may be stationary magnets. For instance, each of the magnets may be fixed to the case 228. The polarities of the magnets are indicated in FIG. 3C by the solid arrows.

The coil arrangement may include a first bottom OIS coil 310 below the first dual pole magnet 306, a second bottom OIS coil 320 below the second dual pole magnet 314, a third bottom OIS coil 322 below the third dual pole magnet 316, and a fourth bottom OIS coil 324 below the fourth dual pole magnet 318. Although not shown in FIG. 3C, the coil arrangement may include a set of top OIS coils that are arranged like the bottom OIS coils, but that are instead located above a respective one of the single pole magnets. Furthermore, the coil arrangement may include a first AF coil 312 proximate a side of the first dual pole magnet 306, a second AF coil 326 proximate a side of the second dual pole magnet 314, a third AF coil 328 proximate a side of the third dual pole magnet 316, and a fourth AF coil 330 proximate a side of the fourth dual pole magnet 318. The direction of current flow of the coils are indicated in FIG. 3C by the dashed arrows.

Figure 4A:
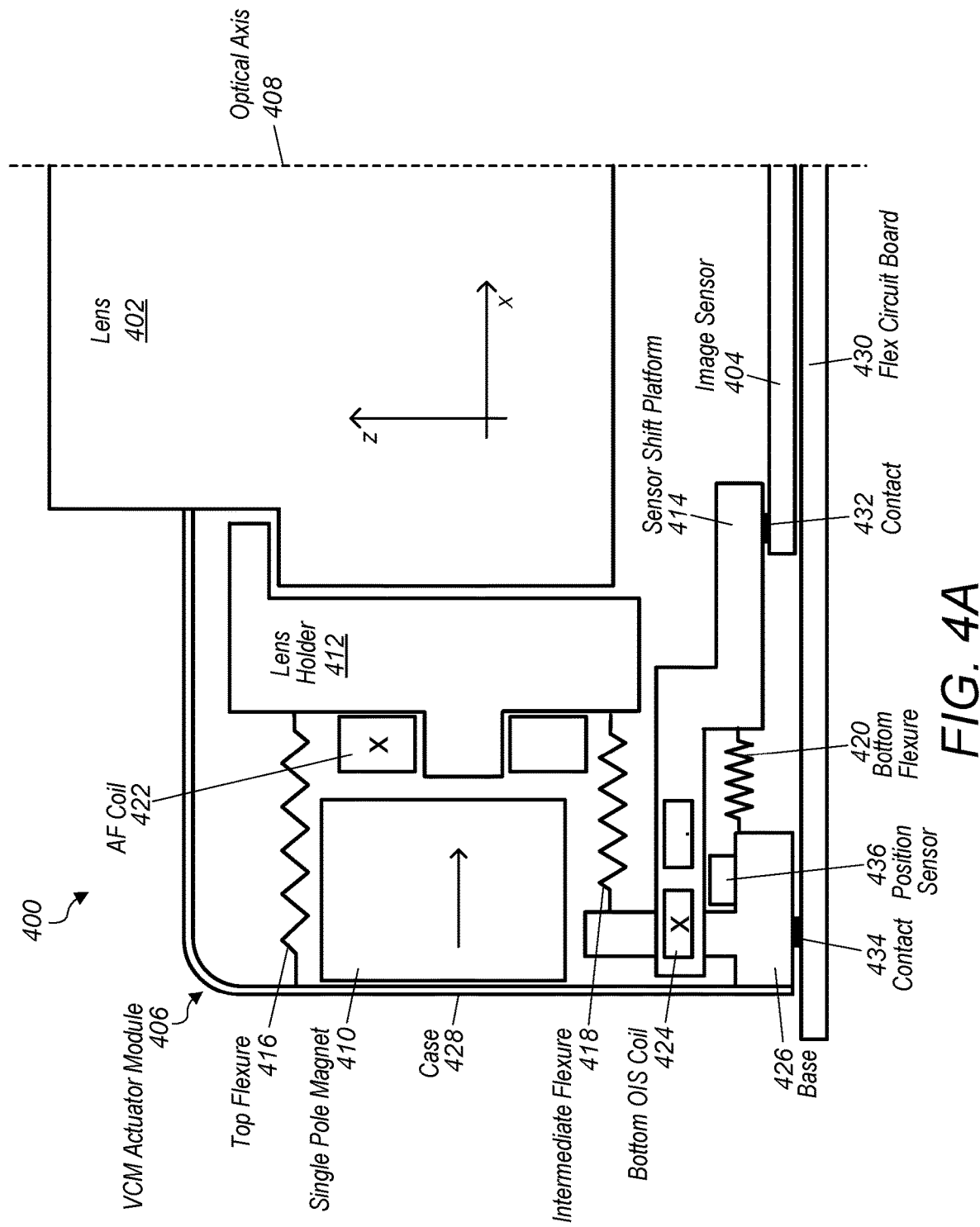
FIGS. 4A and 4B each illustrate a respective cross-sectional view of an example camera module that includes a voice coil motor (VCM) actuator for shifting a lens and an image sensor along multiple axis, in accordance with some embodiments.
Figure 4B:
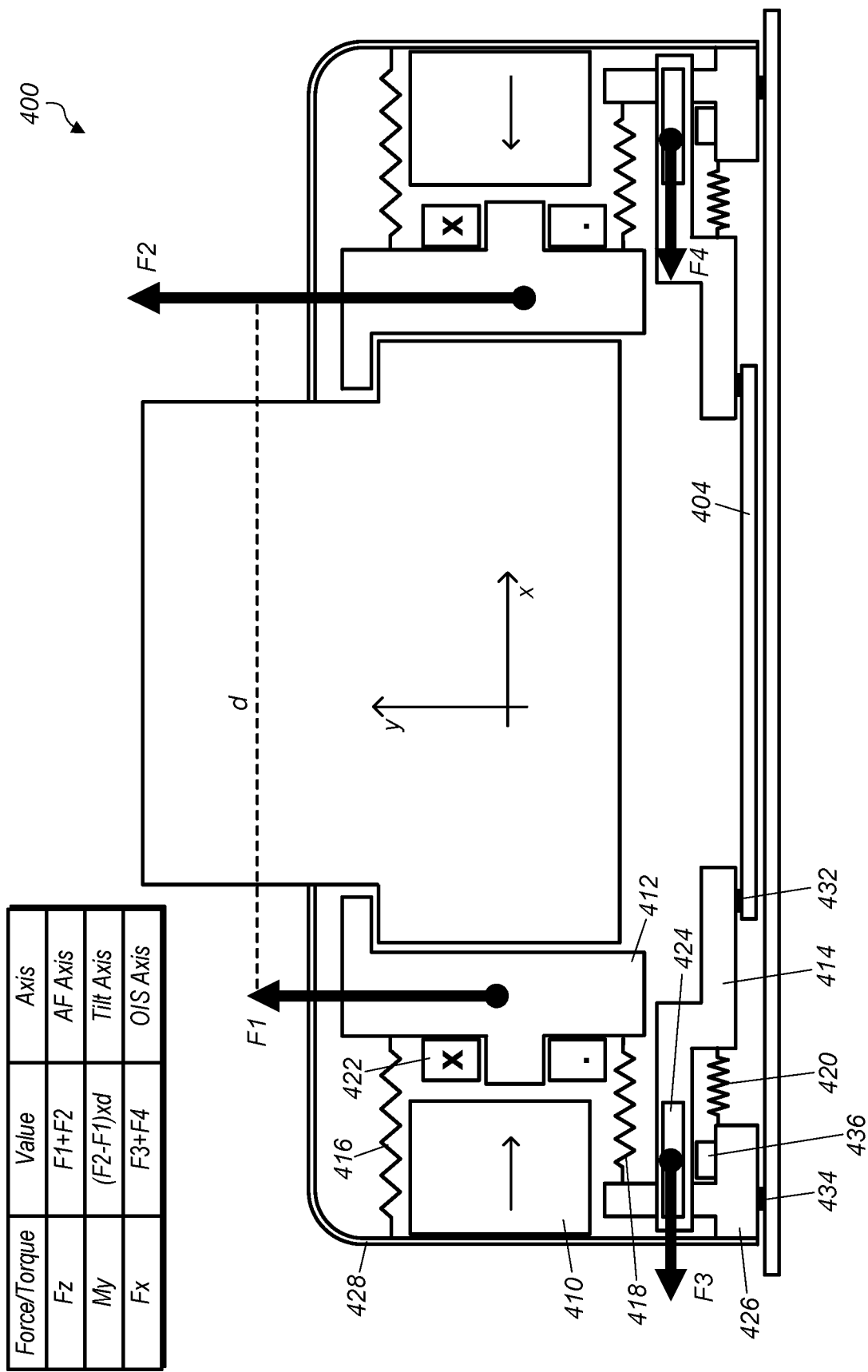

FIGS. 4A and 4B each illustrate a respective cross-sectional view of an example camera module 400 that includes a voice coil motor (VCM) actuator for shifting a lens and an image sensor along multiple axis, in accordance with some embodiments. In some embodiments, the camera module 400 may include one or multiple features, components, and/or functionality of embodiments described herein with reference to FIGS. 1-3C and 4C-11.

In some embodiments, the camera module 400 may include a lens 402, an image sensor 404, and a VCM actuator module 406. The lens 402 may define an optical axis 408. The image sensor 404 may be configured to capture light passing through the lens 402 and convert the captured light into image signals. In some cases, the VCM actuator module 406 may be one of multiple VCM actuator modules of the camera module 400. For instance, the camera module 400 may include four such VCM actuator modules 406, such as two pairs of VCM actuator modules 206 that oppose one another relative to the lens 402. As discussed in further detail below, the VCM actuator module(s) 406 may be configured to move the lens 402 along the optical axis 408 (e.g., to provide autofocus (AF) functionality) and/or tilt the lens 402 relative to the optical axis 408. Furthermore, the VCM actuator module(s) 406 may be configured to move the image sensor 404 in directions orthogonal to the optical axis 408 (e.g., to provide optical image stabilization (OIS) functionality).

In various embodiments, the VCM actuator module 406 may include a stationary single pole magnet 410, a lens holder 412, a sensor shift platform 414, a top flexure 416, an intermediate flexure 418, and a bottom flexure 420. Furthermore, the VCM actuator module 406 may include an auto-focus coil 422 and a bottom OIS coil 424.

In some embodiments, the lens holder 412 may hold, or otherwise support, the AF coil 422 proximate a side of the single pole magnet 410. The lens holder 412 may be coupled to the lens 402 such that the lens 402 shifts together with the lens holder 412.

In some embodiments, the sensor shift platform 414 may hold, or otherwise support, the bottom OIS coil 424 proximate a bottom side of the single pole magnet 410. The sensor shift platform 414 may be coupled to the image sensor 404 such that the image sensor 404 shifts together with the sensor shift platform 414.

The bottom flexure 420 may be configured to mechanically connect the sensor shift platform 414 to a base 426 of the VCM actuator module(s) 406 and/or of the camera module 400. The bottom flexure 420 may also be configured to provide compliance for movement of the sensor shift platform 414 in directions orthogonal to the optical axis 408. Furthermore, the bottom flexure 420 may be configured to support, at least in part, the sensor shift platform 414. In some cases, the sensor shift platform 414 may be suspended from the bottom flexure 420. The base 426 may be a static member that is static relative to one or more moving components (e.g., the sensor shift platform 414). In other embodiments, the bottom flexure 420 may additionally, or alternatively, be connected to a different static member.

The intermediate flexure 418 and the top flexure 416 may be configured to mechanically connect the lens holder 412 the base 426 and a case 428, respectively. For instance, the intermediate flexure 418 may be configured to connect a bottom portion of the lens holder 412 to the base 426, and the top flexure may be configured to connect a top portion of the lens holder 412 to the case 428. The intermediate flexure 418 and the top flexure 416 may also be configured to provide compliance for movement of the lens holder 412 along the optical axis 408 and for tilt of the lens holder 412 relative to the optical axis 408. The case 428 may encompass, at least in part, an interior of the camera module 400. The case 428 may be a static member that is static relative to one or more moving components (e.g., the lens holder 412). In other embodiments, the intermediate flexure 418 and/or the top flexure 416 may additionally, or alternatively, be connected to a different static member.

In some embodiments, the stationary single pole magnet 410 may be fixed to a static member (e.g., the case 428). In some examples, each of the AF coil 422 and the bottom OIS coil 424 may be a race track coil. In some embodiments, the bottom OIS coil may be a flat race track coil that is etched on the sensor shift platform 414.

As indicated in FIG. 4B, interaction between the AF coil 422 and the single pole magnet 410 may produce forces that cause the lens holder 412 to move along the optical axis 408 and/or to tilt relative to the optical axis 408. Interaction between the single pole magnet 410 and the bottom OIS coil 424 may produce forces that cause the sensor shift platform 414 to move in directions orthogonal to the optical axis 408. The lens 402 may shift together with, and in a similar or same manner as, the lens holder 412. Furthermore, the image sensor 404 may shift together with, and in a similar or same manner as, the sensor shift platform 414.

In various embodiments, electrical contacts/connections may allow for image signals to be conveyed from the image sensor 404 to a flex circuit board 430. For instance, the image sensor 404 may be in electrical contact with the sensor shift platform 414 via one or more contacts 432, and thus the image signals may be conveyed from the image sensor 404 to the sensor shift platform 414. The image signals may be conveyed from the sensor shift platform 414 to the base 426 via the bottom flexure 420. For instance, the bottom flexure 420 may include electrical traces that allow for the image signals to be conveyed from the sensor shift platform 414 to the base 426. The base 426 may be in electrical contact with the flex circuit board 430 via one or more contacts 434, and thus the image signals may be conveyed from the base 426 to the flex circuit board 430.

According to various examples, electrical contacts/connections may allow for current to be conveyed from the flex circuit board 430 to the sensor shift platform 414 to drive the bottom OIS coil 424. Furthermore, current may be conveyed from the flex circuit board 430 to the lens holder 412 to drive the AF coil 422. For instance, the flex circuit board 430 may convey the current to the base 426 via the contact(s) 434. The current may be conveyed from the base 426 to the sensor shift platform 414 via the electrical traces of the bottom flexure 420. The sensor shift platform 414 may convey the current to the bottom OIS coil 424. Furthermore, the base 426 may convey the current to the lens holder 412 via the intermediate flexure 418. For instance, the intermediate flexure 418 may include electrical traces that allow for the current to be conveyed from the base 426 to the lens holder 412. The lens holder 412 may convey the current to the AF coil 422.

In some embodiments, the VCM actuator module 406 and/or the camera module 400 may include a position sensor 436 (e.g., a Hall sensor) for position detection based on movement of the bottom OIS coil 424 in directions orthogonal to the optical axis 408. For example, the position sensor 436 may be located on the base 426 or otherwise proximate the bottom OIS coil 424.

Figure 4C:
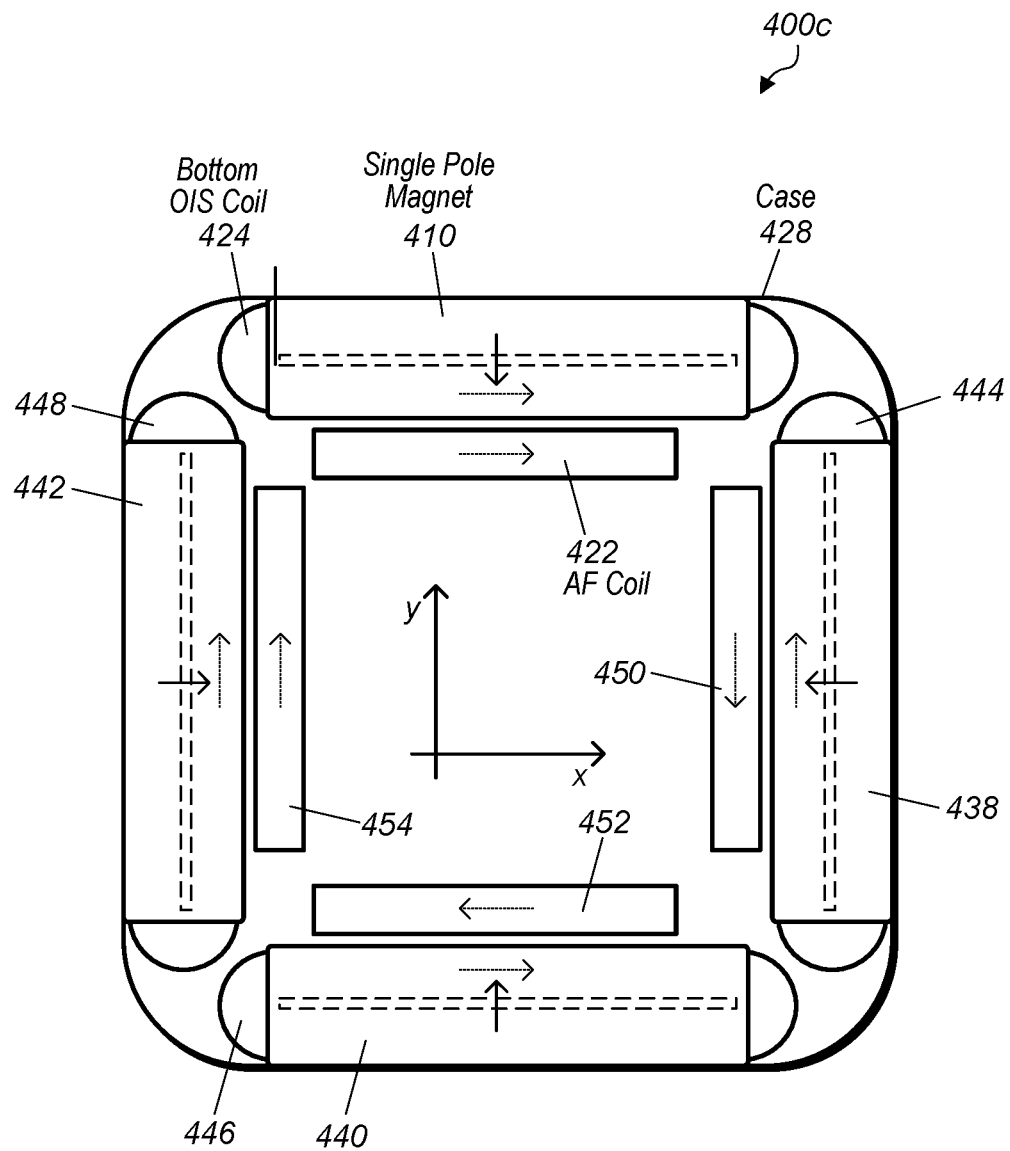
FIG. 4C illustrates a top view of an example magnet and coil arrangement of the VCM actuator in the camera module of FIGS. 4A and 4B, in accordance with some embodiments.

FIG. 4C illustrates a top view of an example magnet and coil arrangement 400c of the VCM actuator in the camera module 400 of FIGS. 4A and 4B, in accordance with some embodiments. In some embodiments, the magnet and coil arrangement 400c may include one or multiple features, components, and/or functionality of embodiments described herein with reference to FIGS. 1-4B and 5-11.

The magnet arrangement may include a first single pole magnet 410, a second single pole magnet 438, a third single pole magnet 440, and a fourth single pole magnet 442. In some embodiments, each of the magnets may be stationary magnets. For instance, each of the magnets may be fixed to the case 428. The polarities of the magnets are indicated in FIG. 4C by the solid arrows.

The coil arrangement may include a first bottom OIS coil 424 below the first single pole magnet 410, a second bottom OIS coil 444 below the second single pole magnet 438, a third bottom OIS coil 446 below the third single pole magnet 440, and a fourth bottom OIS coil 448 below the fourth single pole magnet 442. Furthermore, the coil arrangement may include a first AF coil 422 proximate a side of the first single pole magnet 410, a second AF coil 450 proximate a side of the second single pole magnet 438, a third AF coil 452 proximate a side of the third single pole magnet 440, and a fourth AF coil 454 proximate a side of the fourth single pole magnet 442. The direction of current flow of the coils are indicated in FIG. 4C by the dashed arrows.

Figure 5:
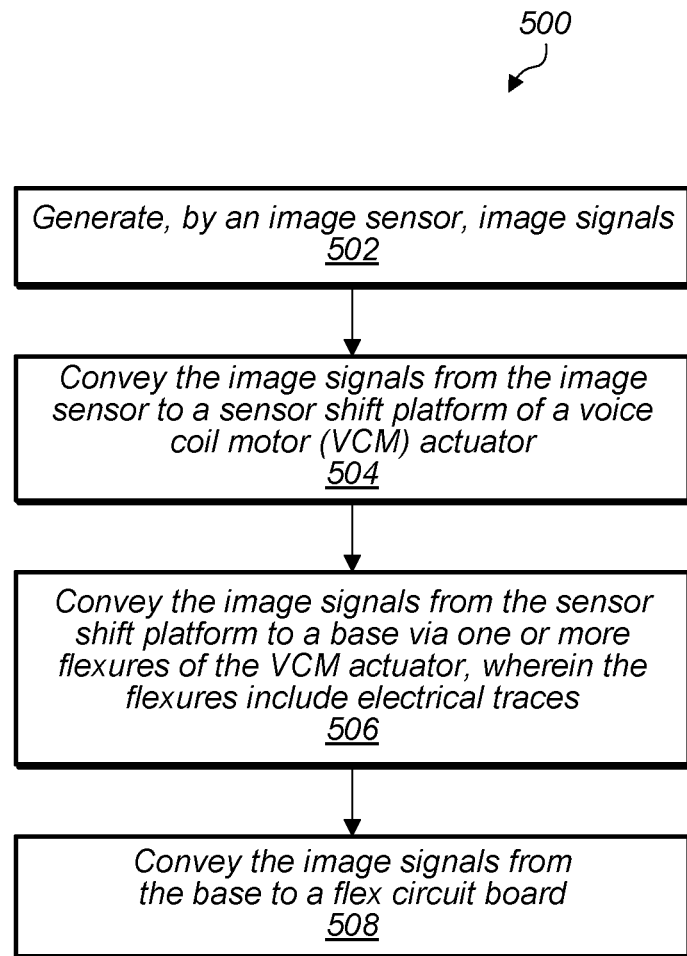
FIG. 5 is a flowchart of an example method of conveying signals (e.g., image signals) from a sensor shift platform of a voice coil motor (VCM) actuator to a flex circuit board, where the signals are conveyed in part via one or more flexures that include electrical traces, in accordance with some embodiments.

FIG. 5 is a flowchart of an example method 500 of conveying signals (e.g., image signals) from a sensor shift platform of a voice coil motor (VCM) actuator (e.g., a VCM actuator of a camera module), where the signals are conveyed in part via one or more flexures that include electrical traces, in accordance with some embodiments. In some embodiments, the method 500 may include one or multiple features, components, and/or functionality of embodiments described herein with reference to FIGS. 1-4C and 6-11.

At 502, the method 500 may include generating signals. For instance, an image sensor of the camera module may generate image signals. At 504, the method 500 may include conveying the image signals from the image sensor to the sensor shift platform of the VCM actuator. At 506, the method 500 may include conveying the image signals from the sensor shift platform to a base of the VCM actuator (e.g., a VCM actuator of a camera module). In some examples, one or more flexures of the VCM actuator may be configured to mechanically connect the sensor shift platform to the base. The flexures may include electrical traces that allow the image signals to be conveyed from the sensor shift platform to base via the flexures. At 508, the method 500 may include conveying the image signals from the base to a flex circuit board. The base may be in electrical contact with the flex circuit board. The flex circuit board may be configured to route the image signals (or other signals) from the camera module to one or more other components in a device and/or system. For instance, the flex circuit board may route signals from the camera module to one or more processors of a device in which the camera module resides.

Figure 6:
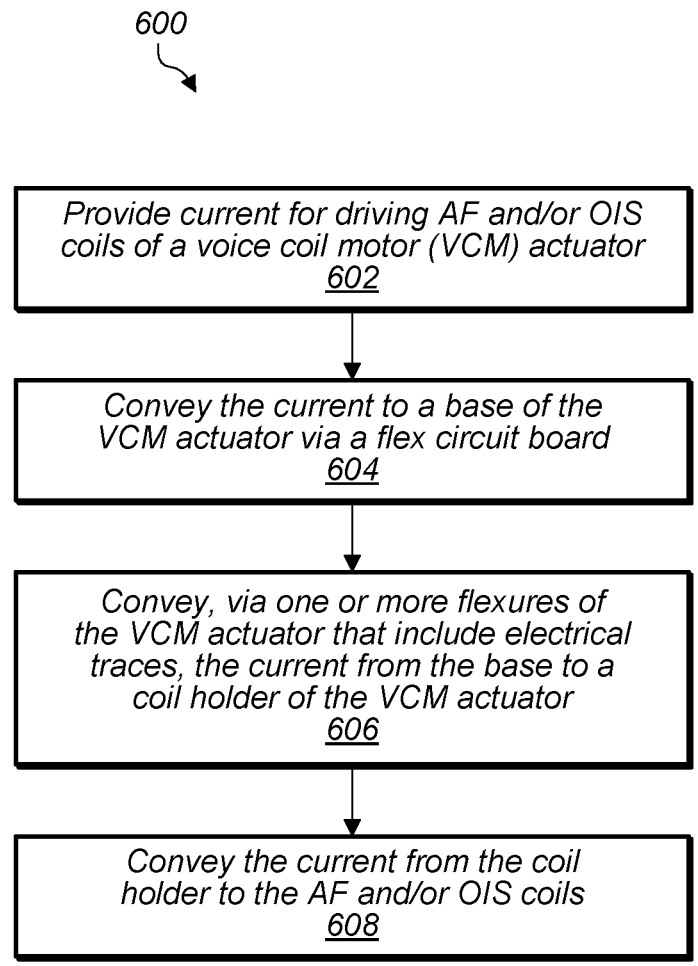
FIG. 6 is a flowchart of an example method of conveying current to one or more coils (e.g., autofocus and/or optical image stabilization coils) of a voice coil motor (VCM) actuator, where the current is conveyed in part via one or more flexures that include electrical traces, in accordance with some embodiments.

FIG. 6 is a flowchart of an example method 600 of conveying current to one or more coils (e.g., autofocus and/or optical image stabilization coils) of a voice coil motor (VCM) actuator (e.g., a VCM actuator of a camera module), where the current is conveyed in part via one or more flexures that include electrical traces, in accordance with some embodiments. In some embodiments, the method 500 may include one or multiple features, components, and/or functionality of embodiments described herein with reference to FIGS. 1-5 and 7-11.

At 602, the method 600 may include providing current for driving one or more coils of the VCM actuator. At 604, the method 600 may include conveying the current to a base of the VCM actuator. For instance, the current may be conveyed to the base via a flex circuit board. The flex circuit board may be in electrical contact with the base. At 606, the method 600 may include conveying the current from the base to a coil holder of the VCM actuator. In some examples, one or more flexures of the VCM actuator may be configured to mechanically connect the coil holder to the base. The flexures may include electrical traces that allow the image signals to be conveyed from the base to the coil holder. At 608, the method 600 may include conveying the current from the coil holder to the coil(s).

Figure 7:
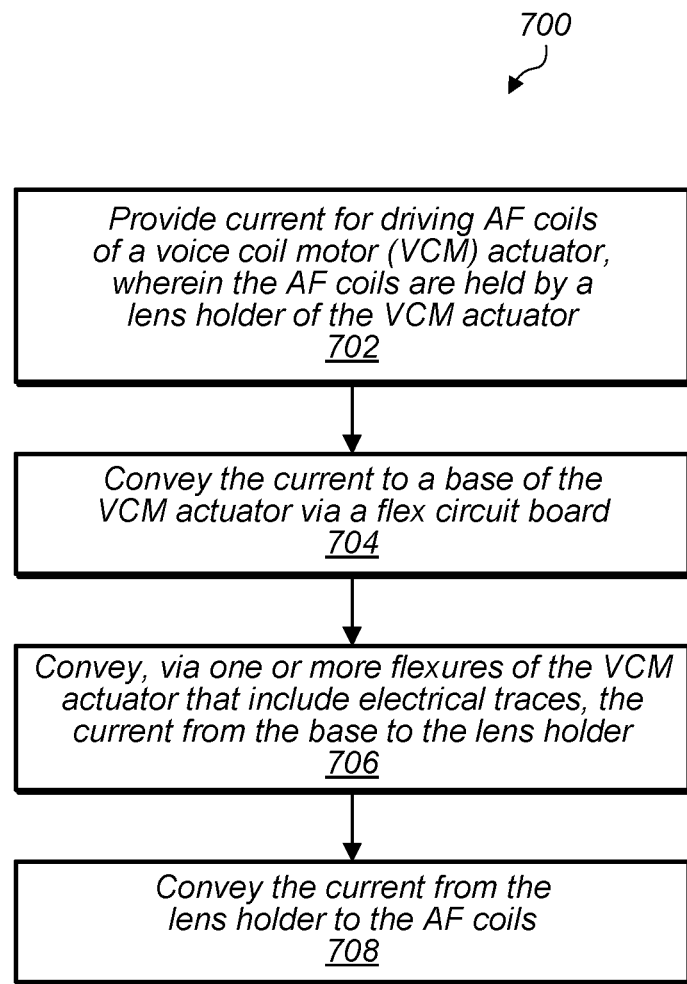
FIG. 7 is a flowchart of an example method of conveying current to one or more autofocus coils of a voice coil motor (VCM) actuator, where the current is conveyed in part via one or more flexures that include electrical traces, in accordance with some embodiments.

FIG. 7 is a flowchart of an example method 700 of conveying current to one or more autofocus coils of a voice coil motor (VCM) actuator (e.g., a VCM actuator of a camera module), where the current is conveyed in part via one or more flexures that include electrical traces, in accordance with some embodiments. In some embodiments, the method 500 may include one or multiple features, components, and/or functionality of embodiments described herein with reference to FIGS. 1-6 and 8-11.

At 702, the method 700 may include providing current for driving one or more autofocus coils of the VCM actuator. The autofocus coil(s) may be held by a lens holder of the VCM actuator. The lens holder may also hold the lens of the camera module such that the lens moves together with the lens holder. At 704, the method 700 may include conveying the current to a base of the VCM actuator. For instance, the current may be conveyed to the base via a flex circuit board. The flex circuit board may be in electrical contact with the base. At 706, the method 700 may include conveying the current from the base to the lens holder. In some examples, one or more flexures of the VCM actuator may be configured to mechanically connect the lens holder to the base. The flexures may include electrical traces that allow the image signals to be conveyed from the base to the lens holder. At 708, the method 700 may include conveying the current from the lens holder to the AF coil(s).

Figure 8:
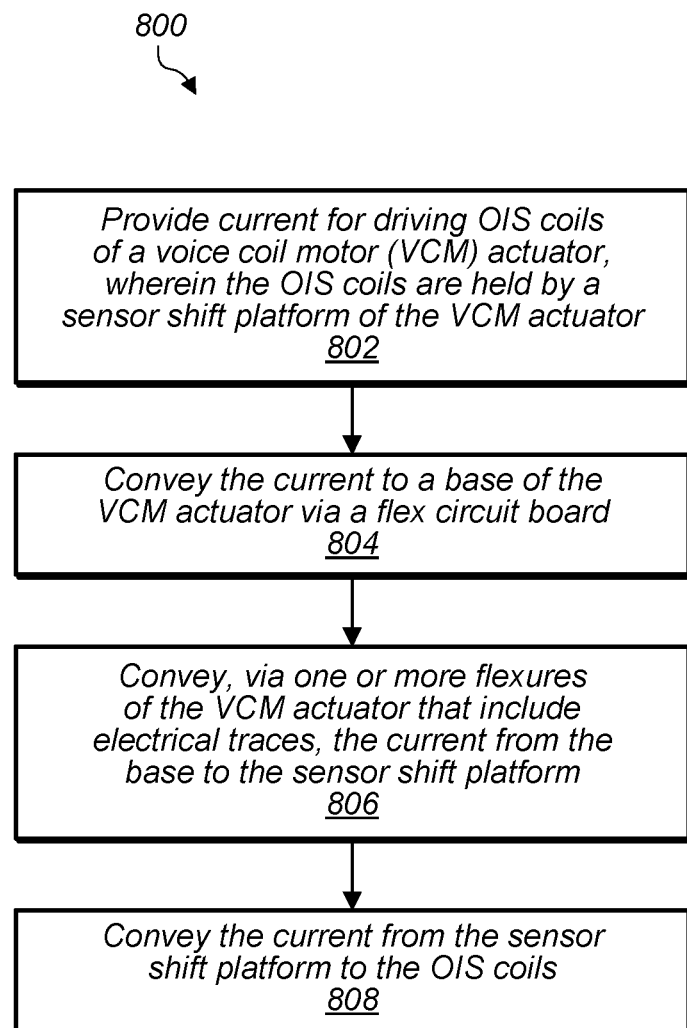
FIG. 8 is a flowchart of an example method of conveying current to one or more optical image stabilization (OIS) coils of a voice coil motor (VCM) actuator, where the current is conveyed in part via one or more flexures that include electrical traces, in accordance with some embodiments.

FIG. 8 is a flowchart of an example method 800 of conveying current to one or more optical image stabilization (OIS) coils of a voice coil motor (VCM) actuator (e.g., a VCM actuator of a camera module), where the current is conveyed in part via one or more flexures that include electrical traces, in accordance with some embodiments. In some embodiments, the method 800 may include one or multiple features, components, and/or functionality of embodiments described herein with reference to FIGS. 1-7 and 9-11.

At 802, the method 800 may include providing current for driving one or more OIS coils of the VCM actuator. The OIS coil(s) may be held by a sensor shift platform of the VCM actuator. The lens holder may also hold the image sensor of the camera module such that the image sensor moves together with the lens holder. At 804, the method 800 may include conveying the current to a base of the VCM actuator. For instance, the current may be conveyed to the base via a flex circuit board. The flex circuit board may be in electrical contact with the base. At 806, the method 800 may include conveying the current from the base to the sensor shift platform. In some examples, one or more flexures of the VCM actuator may be configured to mechanically connect the sensor shift platform to the base. The flexures may include electrical traces that allow the image signals to be conveyed from the base to the sensor shift platform.

Multifunction Device Examples

Figure 9:
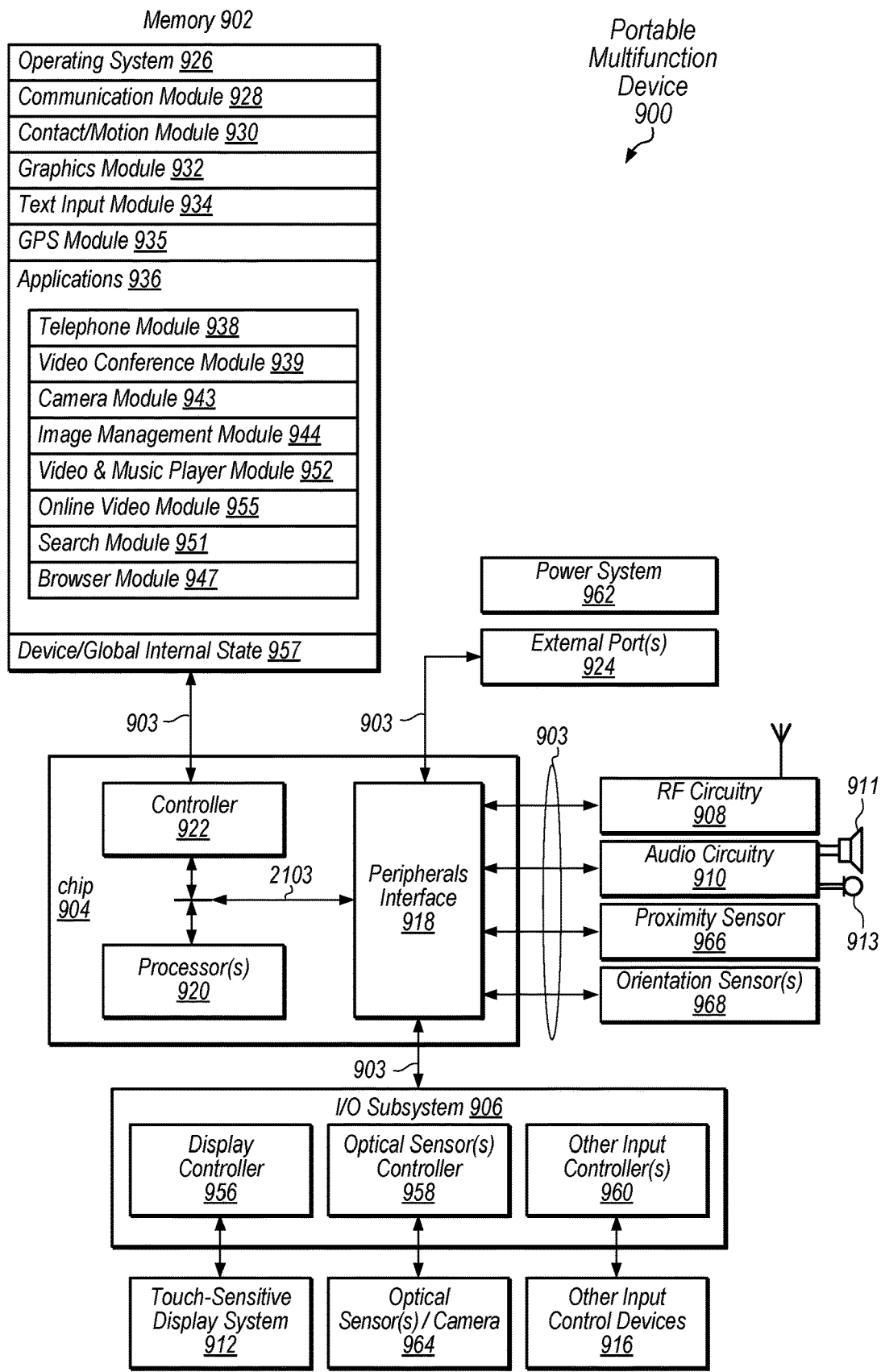
FIG. 9 illustrates a block diagram of a portable multifunction device with a camera, in accordance with some embodiments.

FIG. 9 illustrates a block diagram of a portable multifunction device 900, in accordance with some embodiments. In some embodiments, the portable multifunction device 900 may include one or multiple features, components, and/or implement functionality of embodiments described herein with reference to FIGS. 1-8, 10, and 11.

In some embodiments, the device 900 is a portable communications device, such as a mobile telephone, that also contains other functions, such as PDA, camera, video capture and/or playback, and/or music player functions. Example embodiments of portable multifunction devices include, without limitation, the iPhone®, iPod Touch®, and iPad® devices from Apple Inc. of Cupertino, California Other portable electronic devices, such as laptops, cell phones, smartphones, pad or tablet computers with touch-sensitive surfaces (e.g., touch screen displays and/or touch pads), may also be used. It should also be understood that, in some embodiments, the device is not a portable communications device, but is a desktop computer with a touch-sensitive surface (e.g., a touch screen display and/or a touch pad). In some embodiments, the device is a gaming computer with orientation sensors (e.g., orientation sensors in a gaming controller). In other embodiments, the device is not a portable communications device, but is a camera and/or video camera.

In the discussion that follows, an electronic device that includes a display and a touch-sensitive surface is described. It should be understood, however, that the electronic device may include one or more other physical user-interface devices, such as a physical keyboard, a mouse and/or a joystick.

The device 900 typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, a streaming video application, and/or a digital video player application.

The various applications that may be executed on the device 900 may use at least one common physical user-interface device, such as the touch-sensitive surface. One or more functions of the touch-sensitive surface as well as corresponding information displayed on the device may be adjusted and/or varied from one application to the next and/or within a respective application. In this way, a common physical architecture (such as the touch-sensitive surface) of the device may support the variety of applications with user interfaces that are intuitive and transparent to the user.

Device 900 may include memory 902 (which may include one or more computer readable storage mediums), memory controller 922, one or more processing units (CPU's) 920, peripherals interface 918, RF circuitry 908, audio circuitry 910, speaker 911, touch-sensitive display system 912, microphone 913, input/output (I/O) subsystem 906, other input control devices 916, and external port 924. Device 900 may include one or more optical sensors or cameras 964 (e.g., one or more embodiments of the cameras described herein). These components may communicate over one or more communication buses or signal lines 903.

It should be appreciated that device 900 is only one example of a portable multifunction device, and that device 900 may have more or fewer components than shown, may combine two or more components, or may have a different configuration or arrangement of the components. The various components shown in FIG. 9 may be implemented in hardware, software, or a combination of hardware and software, including one or more signal processing and/or application specific integrated circuits.

Memory 902 may include high-speed random access memory and may also include non-volatile memory, such as one or more magnetic disk storage devices, flash memory devices, or other non-volatile solid-state memory devices. Access to memory 902 by other components of device 900, such as CPU 920 and the peripherals interface 918, may be controlled by memory controller 922.

Peripherals interface 918 can be used to couple input and output peripherals of the device to CPU 920 and memory 902. The one or more processors 920 run or execute various software programs and/or sets of instructions stored in memory 902 to perform various functions for device 900 and to process data.

In some embodiments, peripherals interface 918, CPU 920, and memory controller 922 may be implemented on a single chip, such as chip 904. In some other embodiments, they may be implemented on separate chips.

RF (radio frequency) circuitry 908 receives and sends RF signals, also called electromagnetic signals. RF circuitry 908 converts electrical signals to/from electromagnetic signals and communicates with communications networks and other communications devices via the electromagnetic signals. RF circuitry 908 may include well-known circuitry for performing these functions, including but not limited to an antenna system, an RF transceiver, one or more amplifiers, a tuner, one or more oscillators, a digital signal processor, a coder/ decoder (codec) chipset, a subscriber identity module (SIM) card, memory, and so forth. RF circuitry 908 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a variety of communications standards, protocols and technologies, including but not limited to Global System for Mobile Communications (GSM), Enhanced Data GSM Environment (EDGE), high-speed downlink packet access (HSDPA), high-speed uplink packet access (HSUPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 910, speaker 911, and microphone 913 provide an audio interface between a user and device 900. Audio circuitry 910 receives audio data from peripherals interface 918, converts the audio data to an electrical signal, and transmits the electrical signal to speaker 911. Speaker 911 converts the electrical signal to audible sound waves. Audio circuitry 910 also receives electrical signals converted by microphone 913 from sound waves. Audio circuitry 910 converts the electrical signal to audio data and transmits the audio data to peripherals interface 918 for processing. Audio data may be retrieved from and/or transmitted to memory 902 and/or RF circuitry 908 by peripherals interface 918. In some embodiments, audio circuitry 910 also includes a headset jack. The headset jack provides an interface between audio circuitry 910 and removable audio input/output peripherals, such as output-only headphones or a headset with both output (e.g., a headphone for one or both ears) and input (e.g., a microphone).

I/O subsystem 906 couples input/output peripherals on device 900, such as touch screen 912 and other input control devices 916, to peripherals interface 918. I/O subsystem 906 may include display controller 956 and one or more input controllers 960 for other input control devices 916. The one or more input controllers 960 receive/send electrical signals from/to other input control devices 916. The other input control devices 916 may include physical buttons (e.g., push buttons, rocker buttons, etc.), dials, slider switches, joysticks, click wheels, and so forth. In some alternative embodiments, input controller(s) 960 may be coupled to any (or none) of the following: a keyboard, infrared port, USB port, and a pointer device such as a mouse. The one or more buttons may include an up/down button for volume control of speaker 911 and/or microphone 913. The one or more buttons may include a push button.

Touch-sensitive display 912 provides an input interface and an output interface between the device and a user. Display controller 956 receives and/or sends electrical signals from/to touch screen 912. Touch screen 912 displays visual output to the user. The visual output may include graphics, text, icons, video, and any combination thereof (collectively termed "graphics"). In some embodiments, some or all of the visual output may correspond to user-interface objects.

Touch screen 912 has a touch-sensitive surface, sensor or set of sensors that accepts input from the user based on haptic and/or tactile contact. Touch screen 912 and display controller 956 (along with any associated modules and/or sets of instructions in memory 902) detect contact (and any movement or breaking of the contact) on touch screen 912 and converts the detected contact into interaction with user-interface objects (e.g., one or more soft keys, icons, web pages or images) that are displayed on touch screen 912. In an example embodiment, a point of contact between touch screen 912 and the user corresponds to a finger of the user.

Touch screen 912 may use LCD (liquid crystal display) technology, LPD (light emitting polymer display) technology, or LED (light emitting diode) technology, although other display technologies may be used in other embodiments. Touch screen 912 and display controller 956 may detect contact and any movement or breaking thereof using any of a variety of touch sensing technologies now known or later developed, including but not limited to capacitive, resistive, infrared, and surface acoustic wave technologies, as well as other proximity sensor arrays or other elements for determining one or more points of contact with touch screen 912. In an example embodiment, projected mutual capacitance sensing technology is used, such as that found in the iPhone®, iPod Touch®, and iPad® from Apple Inc. of Cupertino, California Touch screen 912 may have a video resolution in excess of 100 dpi. In some embodiments, the touch screen has a video resolution of approximately 160 dpi. The user may make contact with touch screen 912 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen 912, device 900 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from touch screen 912 or an extension of the touch-sensitive surface formed by the touch screen.

Device 900 also includes power system 962 for powering the various components. Power system 962 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 900 may also include one or more optical sensors or cameras 964. FIG. 9 shows an optical sensor coupled to optical sensor controller 958 in I/O subsystem 906. Optical sensor 964 may, for example, include charge-coupled device (CCD) or complementary metal-oxide semiconductor (CMOS) phototransistors or photosensors. Optical sensor 964 receives light from the environment, projected through one or more lenses, and converts the light to data representing an image. In conjunction with imaging module 943 (also called a camera module), optical sensor 964 may capture still images and/or video sequences. In some embodiments, at least one optical sensor may be located on the back of device 900, opposite touch screen display 912 on the front of the device. In some embodiments, the touch screen display may be used as a viewfinder for still and/or video image acquisition. In some embodiments, at least one optical sensor may instead or also be located on the front of the device.

Device 900 may also include one or more proximity sensors 966. FIG. 9 shows proximity sensor 966 coupled to peripherals interface 918. Alternatively, proximity sensor 966 may be coupled to input controller 960 in I/O subsystem 906. In some embodiments, the proximity sensor turns off and disables touch screen 912 when the multifunction device is placed near the user's ear (e.g., when the user is making a phone call).

Device 900 may also include one or more orientation sensors 968. In some embodiments, the one or more orientation sensors include one or more accelerometers (e.g., one or more linear accelerometers and/or one or more rotational accelerometers). In some embodiments, the one or more orientation sensors include one or more gyroscopes. In some embodiments, the one or more orientation sensors include one or more magnetometers. In some embodiments, the one or more orientation sensors include one or more of global positioning system (GPS), Global Navigation Satellite System (GLONASS), and/or other global navigation system receivers. The GPS, GLONASS, and/or other global navigation system receivers may be used for obtaining information concerning the location and orientation (e.g., portrait or landscape) of device 900. In some embodiments, the one or more orientation sensors include any combination of orientation/rotation sensors. FIG. 9 shows the one or more orientation sensors 968 coupled to peripherals interface 918. Alternatively, the one or more orientation sensors 968 may be coupled to an input controller 960 in I/O subsystem 906. In some embodiments, information is displayed on the touch screen display in a portrait view or a landscape view based on an analysis of data received from the one or more orientation sensors.

In some embodiments, device 900 may also include one or more other sensors (not shown) including but not limited to ambient light sensors and motion detectors. These sensors may be coupled to peripherals interface 918 or, alternatively, may be coupled to an input controller 960 in I/O subsystem 906. For example, in some embodiments, device 900 may include at least one forward-facing (away from the user) and at least one backward-facing (towards the user) light sensors that may be used to collect ambient lighting metrics from the environment of the device 900 for use in video and image capture, processing, and display applications.

In some embodiments, the software components stored in memory 902 include operating system 926, communication module 928, contact/motion module (or set of instructions) 930, graphics module 932, text input module 934, Global Positioning System (GPS) module 935, and applications 936. Furthermore, in some embodiments memory 902 stores device/global internal state 957. Device/global internal state 957 includes one or more of: active application state, indicating which applications, if any, are currently active; display state, indicating what applications, views or other information occupy various regions of touch screen display 912; sensor state, including information obtained from the device's various sensors and input control devices 916; and location information concerning the device's location and/or attitude.

Operating system 926 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 928 facilitates communication with other devices over one or more external ports 924 and also includes various software components for handling data received by RF circuitry 908 and/or external port 924. External port 924 (e.g., Universal Serial Bus (USB), FIRE-WIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Inc.) devices.

Contact/motion module 930 may detect contact with touch screen 912 (in conjunction with display controller 956) and other touch sensitive devices (e.g., a touchpad or physical click wheel). Contact/motion module 930 includes various software components for performing various operations related to detection of contact, such as determining if contact has occurred (e.g., detecting a finger-down event), determining if there is movement of the contact and tracking the movement across the touch-sensitive surface (e.g., detecting one or more finger-dragging events), and determining if the contact has ceased (e.g., detecting a finger-up event or a break in contact). Contact/motion module 930 receives contact data from the touch-sensitive surface. Determining movement of the point of contact, which is represented by a series of contact data, may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multi-touch"/multiple finger contacts). In some embodiments, contact/motion module 930 and display controller 956 detect contact on a touchpad.

Contact/motion module 930 may detect a gesture input by a user. Different gestures on the touch-sensitive surface have different contact patterns. Thus, a gesture may be detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

Graphics module 932 includes various software components for rendering and displaying graphics on touch screen 912 or other display, including components for changing the intensity of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 932 stores data representing graphics to be used. Each graphic may be assigned a corresponding code. Graphics module 932 receives, from applications etc., one or more codes specifying graphics to be displayed along with, if necessary, coordinate data and other graphic property data, and then generates screen image data to output to display controller 956.

Text input module 934, which may be a component of graphics module 932, provides soft keyboards for entering text in various applications that need text input.

GPS module 935 determines the location of the device and provides this information for use in various applications (e.g., to telephone module 938 for use in location-based dialing, to camera module 943 as picture/video metadata, and to applications that provide location-based services such as map/navigation applications).

Applications 936 may include one or more of, but are not limited to, the following modules (or sets of instructions), or a subset or superset thereof:
- telephone module 938;
- video conferencing module 939;
- camera module 943 for still and/or video imaging;
- image management module 944;
- browser module 947;
- search module 951;
- video and music player module 952, which may be made up of a video player module and a music player module; and/or
- online video module 955.
- one or more other modules not shown, such as a gaming module.

Examples of other applications 936 that may be stored in memory 902 include but are not limited to other word processing applications, other image editing applications, drawing applications, presentation applications, communication/social media applications, map applications, JAVA-enabled applications, encryption, digital rights management, voice recognition, and voice replication.

In conjunction with RF circuitry 908, audio circuitry 910, speaker 911, microphone 913, touch screen 912, display controller 956, contact module 930, graphics module 932, and text input module 934, telephone module 938 may be used to enter a sequence of characters corresponding to a telephone number, access one or more telephone numbers in an address book, modify a telephone number that has been entered, dial a respective telephone number, conduct a conversation and disconnect or hang up when the conversation is completed. As noted above, the wireless communication may use any of a variety of communications standards, protocols and technologies.

In conjunction with RF circuitry 908, audio circuitry 910, speaker 911, microphone 913, touch screen 912, display controller 956, optical sensor 964, optical sensor controller 958, contact/motion module 930, graphics module 932, text input module 934, and telephone module 938, videoconferencing module 939 includes executable instructions to initiate, conduct, and terminate a video conference between a user and one or more other participants in accordance with user instructions.

In conjunction with touch screen 912, display controller 956, optical sensor(s) 964, optical sensor controller 958, contact/motion module 930, graphics module 932, and image management module 944, camera module 943 includes executable instructions to capture still images or video (including a video stream) and store them into memory 902, modify characteristics of a still image or video, or delete a still image or video from memory 902.

In conjunction with touch screen 912, display controller 956, contact/motion module 930, graphics module 932, text input module 934, and camera module 943, image management module 944 includes executable instructions to arrange, modify (e.g., edit), or otherwise manipulate, label, delete, present (e.g., in a digital slide show or album), and store still and/or video images.

In conjunction with RF circuitry 908, touch screen 912, display system controller 956, contact/motion module 930, graphics module 932, and text input module 934, browser module 947 includes executable instructions to browse the Internet in accordance with user instructions, including searching, linking to, receiving, and displaying web pages or portions thereof, as well as attachments and other files linked to web pages.

In conjunction with touch screen 912, display system controller 956, contact/motion module 930, graphics module 932, and text input module 934, search module 951 includes executable instructions to search for text, music, sound, image, video, and/or other files in memory 902 that match one or more search criteria (e.g., one or more user-specified search terms) in accordance with user instructions.

In conjunction with touch screen 912, display system controller 956, contact/motion module 930, graphics module 932, audio circuitry 910, speaker 911, RF circuitry 908, and browser module 947, video and music player module 952 includes executable instructions that allow the user to download and play back recorded music and other sound files stored in one or more file formats, such as MP3 or AAC files, and executable instructions to display, present or otherwise play back videos (e.g., on touch screen 912 or on an external, connected display via external port 924). In some embodiments, device 900 may include the functionality of an MP3 player, such as an iPod (trademark of Apple Inc.).

In conjunction with touch screen 912, display system controller 956, contact/motion module 930, graphics module 932, audio circuitry 910, speaker 911, RF circuitry 908, text input module 934, and browser module 947, online video module 955 includes instructions that allow the user to access, browse, receive (e.g., by streaming and/or download), play back (e.g., on the touch screen or on an external, connected display via external port 924), and otherwise manage online videos in one or more video formats, such as the H.264/AVC format or the H.265/HEVC format.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise rearranged in various embodiments. In some embodiments, memory 902 may store a subset of the modules and data structures identified above. Furthermore, memory 902 may store additional modules and data structures not described above.

In some embodiments, device 900 is a device where operation of a predefined set of functions on the device is performed exclusively through a touch screen and/or a touchpad. By using a touch screen and/or a touchpad as the primary input control device for operation of device 900, the number of physical input control devices (such as push buttons, dials, and the like) on device 900 may be reduced.

The predefined set of functions that may be performed exclusively through a touch screen and/or a touchpad include navigation between user interfaces. In some embodiments, the touchpad, when touched by the user, navigates device 900 to a main, home, or root menu from any user interface that may be displayed on device 900. In such embodiments, the touchpad may be referred to as a "menu button." In some other embodiments, the menu button may be a physical push button or other physical input control device instead of a touchpad.

Figure 10:
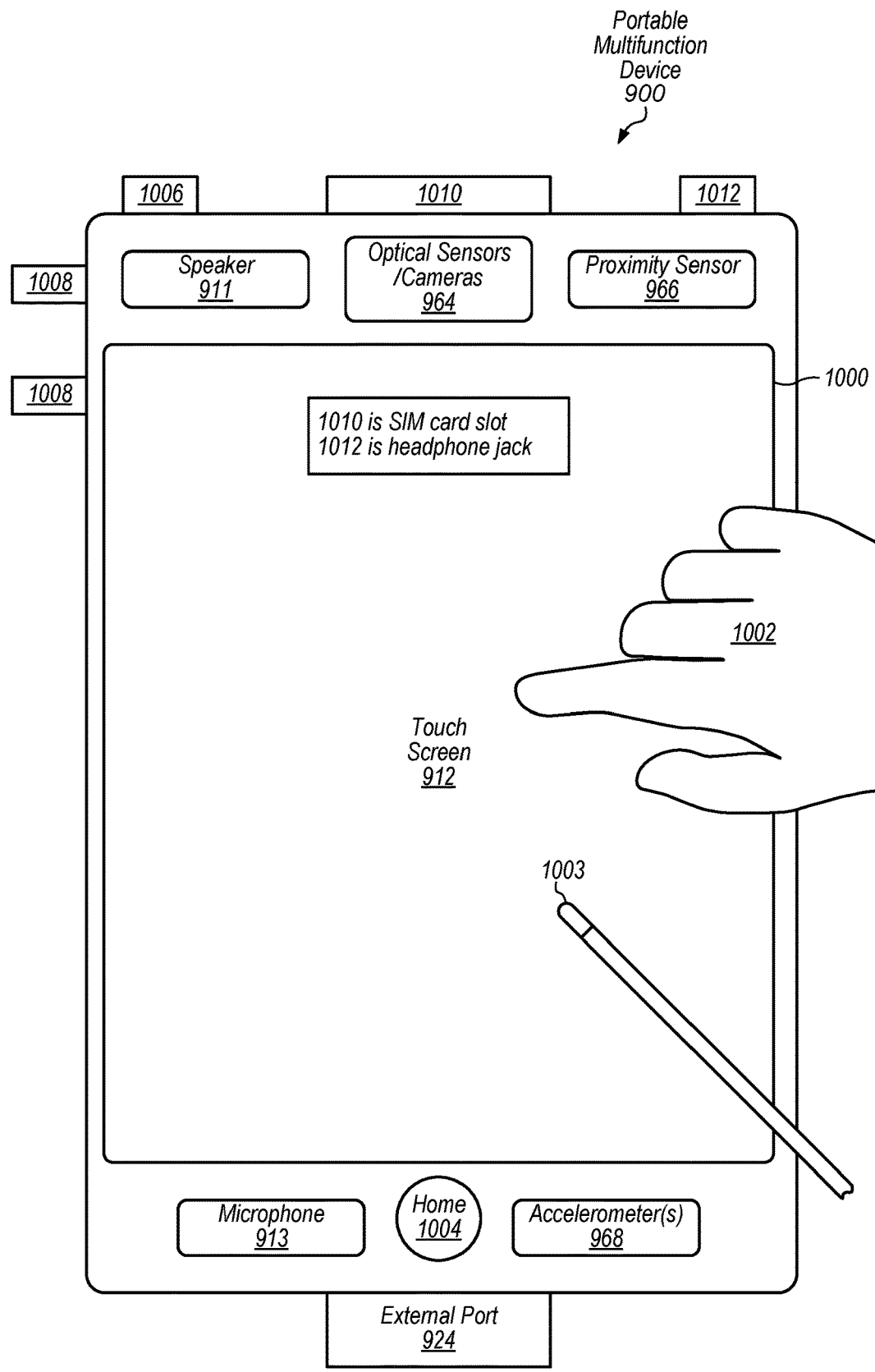
FIG. 10 depicts a portable multifunction device having a camera, in accordance with some embodiments.

FIG. 10 depicts illustrates an example portable multifunction device 900 that may include one or more cameras, in accordance with some embodiments. In some embodiments, the portable multifunction device 900 may include one or multiple features, components, and/or functionality of embodiments described herein with reference to FIGS. 1-9 and 11.

The device 900 may have a touch screen 912. The touch screen 912 may display one or more graphics within user interface (UI) 1000. In this embodiment, as well as others described below, a user may select one or more of the graphics by making a gesture on the graphics, for example, with one or more fingers 1002 (not drawn to scale in the figure) or one or more styluses 1003 (not drawn to scale in the figure).

Device 900 may also include one or more physical buttons, such as "home" or menu button 1004. As described previously, menu button 1004 may be used to navigate to any application 936 in a set of applications that may be executed on device 900. Alternatively, in some embodiments, the menu button 1004 is implemented as a soft key in a GUI displayed on touch screen 912.

In one embodiment, device 900 includes touch screen 912, menu button 1004, push button 1006 for powering the device on/off and locking the device, volume adjustment button(s) 1008, Subscriber Identity Module (SIM) card slot 1010, head set jack 1012, and docking/charging external port 924. Push button 1006 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 900 also may accept verbal input for activation or deactivation of some functions through microphone 913.

It should be noted that, although many of the examples herein are given with reference to optical sensor(s)/camera(s) 964 (on the front of a device), one or more rear-facing cameras or optical sensors that are pointed opposite from the display may be used instead of, or in addition to, an optical sensor(s)/camera(s) 964 on the front of a device.

Example Computer System

Figure 11:
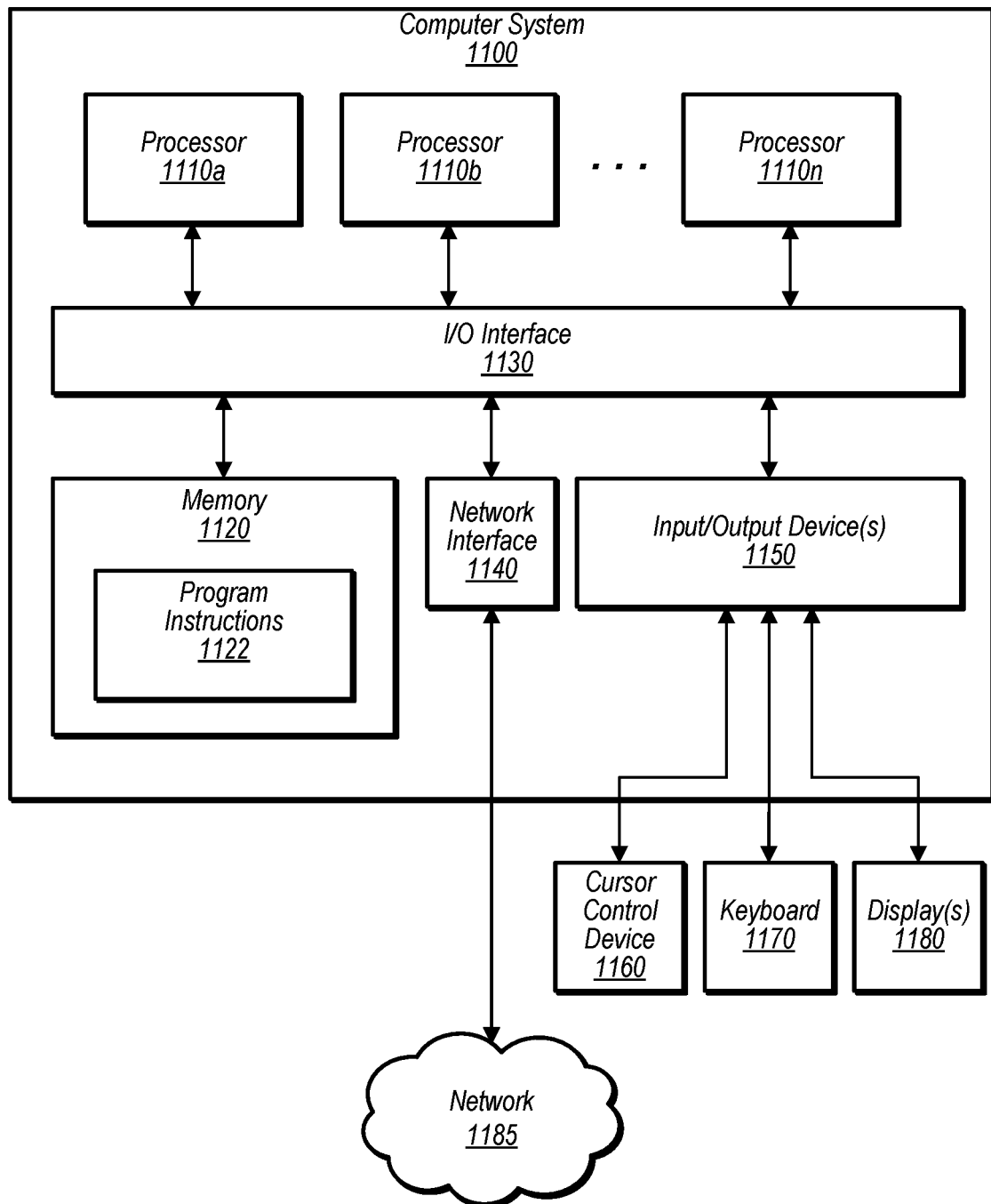
FIG. 11 illustrates an example computer system that may include a camera, in accordance with some embodiments.

FIG. 11 illustrates an example computer system 1100 that may include one or more cameras, in accordance with some embodiments. In some embodiments, the computer system 1100 may include one or multiple features, components, and/or implement functionality of embodiments described herein with reference to FIGS. 1-10.

The computer system 1100 may be configured to execute any or all of the embodiments described above. In different embodiments, computer system 1100 may be any of various types of devices, including, but not limited to, a personal computer system, desktop computer, laptop, notebook, tablet, slate, pad, or netbook computer, mainframe computer system, handheld computer, workstation, network computer, a camera, a set top box, a mobile device, a consumer device, video game console, handheld video game device, application server, storage device, a television, a video recording device, a peripheral device such as a switch, modem, router, or in general any type of computing or electronic device.

Various embodiments of a camera motion control system as described herein, including embodiments of magnetic position sensing, as described herein may be executed in one or more computer systems 1100, which may interact with various other devices. Note that any component, action, or functionality described above with respect to FIGS. 1-10 may be implemented on one or more computers configured as computer system 1100 of FIG. 11, according to various embodiments. In the illustrated embodiment, computer system 1100 includes one or more processors 1110 coupled to a system memory 1120 via an input/output (I/O) interface 1130. Computer system 1100 further includes a network interface 1140 coupled to I/O interface 1130, and one or more input/output devices 1150, such as cursor control device 1160, keyboard 1170, and display(s) 1180. In some cases, it is contemplated that embodiments may be implemented using a single instance of computer system 1100, while in other embodiments multiple such systems, or multiple nodes making up computer system 1100, may be configured to host different portions or instances of embodiments. For example, in one embodiment some elements may be implemented via one or more nodes of computer system 1100 that are distinct from those nodes implementing other elements.

In various embodiments, computer system 1100 may be a uniprocessor system including one processor 1110, or a multiprocessor system including several processors 1110 (e.g., two, four, eight, or another suitable number). Processors 1110 may be any suitable processor capable of executing instructions. For example, in various embodiments processors 1110 may be general-purpose or embedded processors implementing any of a variety of instruction set architectures (ISAs), such as the x86, PowerPC, SPARC, or MIPS ISAs, or any other suitable ISA. In multiprocessor systems, each of processors 1110 may commonly, but not necessarily, implement the same ISA.

System memory 1120 may be configured to store program instructions 1122 accessible by processor 1110. In various embodiments, system memory 1120 may be implemented using any suitable memory technology, such as static random access memory (SRAM), synchronous dynamic RAM (SDRAM), nonvolatile/Flash-type memory, or any other type of memory. Additionally, existing camera control data 1132 of memory 1120 may include any of the information or data structures described above. In some embodiments, program instructions and/or data may be received, sent or stored upon different types of computer-accessible media or on similar media separate from system memory 1120 or computer system 1100. While computer system 1100 is described as implementing the functionality of functional blocks of previous figures, any of the functionality described herein may be implemented via such a computer system.

In one embodiment, I/O interface 1130 may be configured to coordinate I/O traffic between processor 1110, system memory 1120, and any peripheral devices in the device, including network interface 1140 or other peripheral interfaces, such as input/output devices 1150. In some embodiments, I/O interface 1130 may perform any necessary protocol, timing or other data transformations to convert data signals from one component (e.g., system memory 1120) into a format suitable for use by another component (e.g., processor 1110). In some embodiments, I/O interface 1130 may include support for devices attached through various types of peripheral buses, such as a variant of the Peripheral Component Interconnect (PCI) bus standard or the Universal Serial Bus (USB) standard, for example. In some embodiments, the function of I/O interface 1130 may be split into two or more separate components, such as a north bridge and a south bridge, for example. Also, in some embodiments some or all of the functionality of I/O interface 1130, such as an interface to system memory 1120, may be incorporated directly into processor 1110.

Network interface 1140 may be configured to allow data to be exchanged between computer system 1100 and other devices attached to a network 1185 (e.g., carrier or agent devices) or between nodes of computer system 1100. Network 1185 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 1140 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1150 may, in some embodiments, include one or more display terminals, keyboards, keypads, touchpads, scanning devices, voice or optical recognition devices, or any other devices suitable for entering or accessing data by one or more computer systems 1100. Multiple input/output devices 1150 may be present in computer system 1100 or may be distributed on various nodes of computer system 1100. In some embodiments, similar input/output devices may be separate from computer system 1100 and may interact with one or more nodes of computer system 1100 through a wired or wireless connection, such as over network interface 1140.

As shown in FIG. 11, memory 1120 may include program instructions 1122, which may be processor-executable to implement any element or action described above. In one embodiment, the program instructions may implement the methods described above. In other embodiments, different elements and data may be included. Note that data may include any data or information described above.

Those skilled in the art will appreciate that computer system 1100 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 1100 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1100 may be transmitted to computer system 1100 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A camera, comprising:
   a lens that defines an optical axis;
   an image sensor configured to capture light passing through the lens and convert the captured light into image signals;
   a voice coil motor (VCM) actuator, comprising:
      a magnet; and
      a plurality of coils;
      a sensor shift platform coupled to the image sensor such that the image sensor is moveable together with the sensor shift platform;
      flexures to mechanically connect one or more dynamic components of the camera to one or more static components of the camera, wherein the one or more dynamic components include the sensor shift platform; and
      a coil holder coupled with at least one autofocus (AF) coil of the plurality of coils, such that the at least one AF coil is positioned in a direction orthogonal to the optical axis, between the magnet and at least a portion of the coil holder;
wherein to move the image sensor or the lens in a direction parallel to the optical axis, the VCM actuator is configured to cause the at least one AF coil to magnetically interact with the magnet.

2. The camera of claim 1, wherein the at least one AF coil extends around the lens in a plane that is orthogonal to the optical axis.

3. The camera of claim 1, wherein the VCM actuator further comprises:
an optical image stabilization (OIS) coil attached to the coil holder and positioned proximate the magnet;
wherein to move the image sensor in a direction orthogonal to the optical axis, the VCM actuator is configured to cause the OIS coil to magnetically interact with the magnet.

4. The camera of claim 1, wherein:
to move the image sensor or the lens in a tilt direction relative to the optical axis, the VCM actuator is configured to cause the at least one AF coil to magnetically interact with the magnet independently relative to at least one other AF coil and at least one other magnet of the VCM.

5. The camera of claim 1, wherein the flexures comprise:
a bottom flexure that extends along a first plane orthogonal to the optical axis; and
a top flexure that extends along a second plane orthogonal to the optical axis.

6. The camera of claim 1, wherein the camera is configured to convey current to drive the at least one AF coil via at least one of the flexures.

7. The camera of claim 1, wherein the coil holder is attached to an upper surface of the sensor shift platform.

8. A device, comprising:
one or more processors;
memory storing program instructions that are executable by the one or more processors to control operation of a camera; and
the camera, comprising:
a lens that defines an optical axis;
an image sensor configured to capture light passing through the lens and convert the captured light into image signals;
a voice coil motor (VCM) actuator, comprising:
a magnet; and
a plurality of coils;
a sensor shift platform coupled to the image sensor such that the image sensor is moveable together with the sensor shift platform;
flexures to mechanically connect one or more dynamic components of the camera to one or more static components of the camera, wherein the one or more dynamic components include the sensor shift platform; and
a coil holder coupled with at least one autofocus (AF) coil of the plurality of coils, such that the at least one AF coil is positioned in a direction orthogonal to the optical axis, between the magnet and at least a portion of the coil holder;
wherein to move the image sensor or the lens in a direction parallel to the optical axis, the VCM actuator is configured to cause the at least one AF coil to magnetically interact with the magnet.

9. The device of claim 8, wherein the at least one AF coil extends around the lens in a plane that is orthogonal to the optical axis.

10. The device of claim 8, wherein the VCM actuator further comprises:
an optical image stabilization (OIS) coil attached to the coil holder and positioned proximate the magnet;
wherein to move the image sensor in a direction orthogonal to the optical axis, the VCM actuator is configured to cause the OIS coil to magnetically interact with the magnet.

11. The device of claim 8, wherein:
to move the image sensor or the lens in a tilt direction relative to the optical axis, the VCM actuator is configured to cause the at least one AF coil to magnetically interact with the magnet independently relative to at least one other AF coil and at least one other magnet of the VCM.

12. The device of claim 8, wherein the flexures comprise:
a bottom flexure that extends along a first plane orthogonal to the optical axis; and
a top flexure that extends along a second plane orthogonal to the optical axis.

13. The device of claim 8, wherein the camera is configured to convey current to drive the at least one AF coil via at least one of the flexures.

14. The device of claim 8, wherein the coil holder is attached to an upper surface of the sensor shift platform.

15. A system, comprising:
a voice coil motor (VCM) actuator, comprising:
a magnet; and
a plurality of coils;
a sensor shift platform for coupling with an image sensor of a camera, such that the image sensor is moveable together with the sensor shift platform;
flexures to mechanically connect one or more dynamic components of the camera to one or more static components of the camera, wherein the one or more dynamic components include the sensor shift platform; and
a coil holder coupled with at least one autofocus (AF) coil of the plurality of coils, such that the at least one AF coil is positioned in a direction orthogonal to an optical axis, between the magnet and at least a portion of the coil holder;
wherein to move the image sensor or a lens in a direction parallel to the optical axis defined by the lens of the camera, the VCM actuator is configured to cause at least AF coils of the plurality of coils to magnetically interact with the magnet.

16. The system of claim 15, wherein the at least one AF coil extends around the lens in a plane that is orthogonal to the optical axis.

17. The system of claim 15, wherein the VCM actuator further comprises:
an optical image stabilization (OIS) coil attached to the coil holder and positioned proximate the magnet;
wherein to move the image sensor in a direction orthogonal to the optical axis, the VCM actuator is configured to cause the OIS coil to magnetically interact with the magnet.

18. The system of claim 15, wherein:
to move the image sensor or the lens in a tilt direction relative to the optical axis, the VCM actuator is configured to cause the at least one AF coil to magnetically interact with the magnet independently relative to at least one other AF coil and at least one other magnet of another VCM.

19. The system of claim 15, wherein the flexures comprise:
 a bottom flexure that extends along a first plane orthogonal to the optical axis; and
 a top flexure that extends along a second plane orthogonal to the optical axis.

20. The system of claim 15, wherein the camera is configured to convey current to drive the at least one AF coil via at least one of the flexures.

* * * * *